(12) United States Patent
Murai

(10) Patent No.: US 10,934,976 B2
(45) Date of Patent: Mar. 2, 2021

(54) EVAPORATED FUEL TREATMENT DEVICE

(71) Applicant: AISAN KOGYO KABUSHIKI KAISHA, Obu (JP)

(72) Inventor: Shinji Murai, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 2 days.

(21) Appl. No.: 15/539,207

(22) PCT Filed: Sep. 14, 2015

(86) PCT No.: PCT/JP2015/076019
§ 371 (c)(1),
(2) Date: Jun. 23, 2017

(87) PCT Pub. No.: WO2016/103806
PCT Pub. Date: Jun. 30, 2016

(65) Prior Publication Data
US 2017/0356394 A1    Dec. 14, 2017

(30) Foreign Application Priority Data

Dec. 25, 2014   (JP) .............................. JP2014-263145

(51) Int. Cl.
*F02M 25/08* (2006.01)
*F02D 41/00* (2006.01)
(Continued)

(52) U.S. Cl.
CPC ..... *F02M 25/0836* (2013.01); *F02D 41/0045* (2013.01); *F02M 25/089* (2013.01);
(Continued)

(58) Field of Classification Search
CPC ............ F02M 25/0836; F02M 25/0872; F02D 41/0045; F16K 17/196; F16K 17/02;
(Continued)

(56) References Cited

U.S. PATENT DOCUMENTS 2,045,780 A * 6/1936 Jett ....................... F16K 17/196
137/493.4
5,141,020 A * 8/1992 Sunderhaus ....... B60K 15/0406
137/467
(Continued)

FOREIGN PATENT DOCUMENTS

JP          S54158996 U       11/1979
JP          S6122964 U         2/1986
(Continued)

OTHER PUBLICATIONS

Japanese Office Action dated Nov. 8, 2017, for Japanese Application No. 2014-263147 (3 p.).
(Continued)

*Primary Examiner* — Logan M Kraft
*Assistant Examiner* — Joshua Campbell
(74) *Attorney, Agent, or Firm* — Conley Rose, P.C.

(57) ABSTRACT

An evaporated fuel treatment device is provided with an electric-operated valve, a positive-pressure relief valve mechanism and a negative-pressure relief valve mechanism. The electric-operated valve has a valve body for opening/closing a vapor passage allowing a fuel tank and a canister, and adjusts the flow rate by electrical control. The positive-pressure relief valve mechanism opens when the pressure at the fuel tank side has a value greater than or equal to a predetermined positive pressure value. The negative-pressure relief valve mechanism opens when the pressure at the fuel tank side has a value less than or equal to a predetermined negative pressure value. The electric-operated valve is configured such that the valve body is moved in the valve opening direction by the pressure at the fuel tank side that is higher, by a predetermined value, than the valve opening pressure for the positive-pressure relief valve mechanism.

16 Claims, 9 Drawing Sheets

(51) Int. Cl.
*F16K 31/04* (2006.01)
*F16K 31/06* (2006.01)

(52) U.S. Cl.
CPC . *F02M 25/0872* (2013.01); *F02M 2025/0845* (2013.01); *F16K 31/04* (2013.01); *F16K 31/046* (2013.01); *F16K 31/047* (2013.01); *F16K 31/048* (2013.01); *F16K 31/0651* (2013.01)

(58) Field of Classification Search
CPC ........ F16K 17/18; F16K 31/04; F16K 31/046; F16K 31/048
USPC ........................................................ 123/520
See application file for complete search history.

(56) References Cited

U.S. PATENT DOCUMENTS

| | | | | |
|---|---|---|---|---|
| 5,305,724 | A | * | 4/1994 | Chikamatsu ....... F02M 25/0809 123/198 D |
| 8,584,704 | B2 | | 11/2013 | Pifer et al. |
| 8,622,088 | B2 | | 1/2014 | Sugiura et al. |
| 9,284,923 | B2 | | 3/2016 | Kimoto et al. |
| 2004/0089275 | A1 | * | 5/2004 | Kidokoro ........... F02M 25/0836 123/520 |
| 2005/0279331 | A1 | * | 12/2005 | Robertson .......... F02M 25/0836 123/520 |
| 2006/0086343 | A1 | * | 4/2006 | Suzuki ................ F02M 25/089 123/520 |
| 2011/0114860 | A1 | * | 5/2011 | Schade ................ F16K 31/047 251/69 |
| 2011/0168931 | A1 | * | 7/2011 | Sugiura ................... F16K 1/443 251/129.15 |
| 2013/0245840 | A1 | * | 9/2013 | Lazzara .................. F16K 17/00 700/282 |
| 2014/0102420 | A1 | | 4/2014 | Kimoto et al. |
| 2016/0298577 | A1 | | 10/2016 | Kimoto et al. |

FOREIGN PATENT DOCUMENTS

| | | | |
|---|---|---|---|
| JP | 11030156 A | * | 2/1999 |
| JP | 2002-317707 A | | 10/2002 |
| JP | 2002317707 A | * | 10/2002 |
| JP | 2002317707 A | * | 10/2002 |
| JP | 2011-144848 A | | 7/2011 |
| JP | 2012-524878 A | | 10/2012 |
| JP | 2013-221640 A | | 10/2013 |
| JP | 2014-77422 A | | 5/2014 |
| JP | 2015-102019 A | | 6/2015 |

OTHER PUBLICATIONS

English Translation of Japanese Office Action dated Nov. 8, 2017, for Japanese Application No. 2014-263147 (3 p.).
International Patent Application No. PCT/JP2015/076019 International Search Report dated Dec. 8, 2015 (5 pages).
Japanese Office Action dated Oct. 19, 2017, for Japanese Application No. 2014-263145 (4 p.).
English Translation of Japanese Office Action dated Oct. 19, 2017, for Japanese Application No. 2014-263145 (4 p.).
Japanese Office Action dated Jan. 24, 2019, for Japanese Application No. 2018-071995 (3 p.).
English Translation of Japanese Office Action dated Jan. 24, 2019, for Japanese Application No. 2018-071995 (3 p.).
Chinese Office Action dated Dec. 4, 2018, for Chinese Application No. 201580070523.6 ( 5 p.).
English Translation of Chinese Office Action dated Dec. 4, 2018, for Chinese Application No. 201580070523.6 ( 5 p.).

* cited by examiner

EVAPORATED FUEL TREATMENT DEVICE

CROSS-REFERENCE TO RELATED APPLICATIONS

The present application is a National Phase entry of, and claims priority to, PCT Application No. PCT/JP2015/0076019, filed Sep. 14, 2015, which claims priority to Japanese Patent Application No. 2014-263147, filed Dec. 25, 2014 and Japanese Patent Application No. 2014-263145, filed Dec. 25, 2014, all of which are incorporated by reference herein in their entireties for all purposes.

STATEMENT REGARDING FEDERALLY SPONSORED RESEARCH OR DEVELOPMENT

Not applicable.

BACKGROUND

The present disclosure relates to an evaporated fuel treatment device, which is mainly mounted on a vehicle.

An evaporated fuel treatment device includes an electric-operated valve, which is disposed at a vapor passage connecting a fuel tank to a canister and adjusts a flow rate by electrical control, a positive-pressure relief valve mechanism, which opens when the pressure at a fuel tank side has a value greater than or equal to a predetermined positive value, and a negative-pressure relief valve mechanism, which opens when the pressure at the fuel tank side has a value less than or equal to a predetermined negative value (refer to Japanese Laid-Open Patent Publication No. 2012-524878). A solenoid assembly, a relief valve and a flow rate regulator in the Japanese Laid-Open Patent Publication No. 2012-524878 correspond to the electric-operated valve, the positive-pressure relief valve mechanism and the negative-pressure relief valve mechanism in this description, respectively.

In Japanese Laid-Open Patent Publication No. 2012-524878, the pressure at the fuel tank side is predicted to increase beyond an excessive pressure that is much higher than a valve opening pressure for the positive-pressure relief valve mechanism upon a failure of the positive-pressure relief valve mechanism. This is because the electric-operated valve does not open due to the excessive pressure at the fuel tank side. Therefore, there has been a need for improved evaporated fuel treatment devices.

BRIEF SUMMARY

In one aspect of this disclosure, an evaporated fuel treatment device includes an electric-operated valve, a positive-pressure relief valve mechanism and a negative-pressure relief valve mechanism. The electric-operated valve includes a valve body for opening and closing a vapor passage communicating a fuel tank with a canister and adjusts a flow rate by electrical control. The positive-pressure relief valve mechanism opens when a pressure at the fuel tank side has a value that is equal to or greater than a predetermined positive pressure value. The negative-pressure relief valve mechanism opens when the pressure at the fuel tank side has a value that is equal to or less than a predetermined negative pressure value. The valve body of the electric-operated valve is moved in a valve opening direction by the pressure at the fuel tank side that is higher than a valve opening pressure for the positive-pressure relief valve mechanism by a predetermined value. According to this aspect, under a condition where the positive-pressure relief valve mechanism is out of order, the valve body of the electric-operated valve is moved in the valve opening direction by the pressure at the fuel tank side that is higher than the valve opening pressure for the positive-pressure relief valve mechanism. Thus, the valve body is moved to a valve open position, so the pressure at the fuel tank side is released to the canister side. Accordingly, the pressure at the fuel tank side can be prevented from increasing to an excessive pressure or higher. Here, with respect to the pressure at the fuel tank side in this description, the pressure higher than the valve opening pressure for the positive-pressure relief valve mechanism by the predetermined value means a pressure that is higher than the valve opening pressure for the positive-pressure relief valve mechanism by the predetermined value and is less than the excessive pressure much higher than the valve opening pressure for the positive-pressure relief valve mechanism.

In another aspect of this disclosure, the electric-operated valve includes an electric-operated motor having an output shaft capable of moving in an axial direction thereof. The output shaft of the electric-operated motor is provided with a valve guide via a feed screw mechanism such that a stroke of the valve guide in the axial direction can be controlled. The valve guide is provided with the valve body such that the valve body can move in the axial direction within a predetermined range. The valve body is energized by a valve body energizing member in a valve closing direction. The valve body is moved in the valve opening direction against energization by the valve body energizing member when the pressure at the fuel tank side is higher than the valve opening pressure for the positive-pressure relief valve mechanism by the predetermined value under a condition where the electric-operated valve is in a closed state. According to this aspect, the valve body of the electric-operated valve is moved in the valve opening direction relative to the valve guide by the pressure at the fuel tank side that is higher, by the predetermined value, than the valve opening pressure for the positive-pressure relief valve mechanism under a condition where the positive-pressure relief valve mechanism is out of order. Thus, the valve body is moved to the valve open position, so the pressure at the fuel tank side is released to the canister side.

In another aspect of this disclosure, the electric-operated valve includes an electric-operated motor having an output shaft capable of moving in an axial direction thereof. The output shaft of the electric-operated motor is provided with the valve body via a feed screw mechanism such that a stroke of the valve body in the axial direction can be controlled and that the valve body can move in the axial direction within a predetermined range. The valve body is energized in a valve closing direction by a valve body energizing member. The valve body is moved in the valve opening direction against energization by the valve body energizing member when the pressure at the fuel tank side is higher than the valve opening pressure for the positive-pressure relief valve mechanism by the predetermined value under a condition where the electric-operated valve is in a closed state. According to this aspect, the valve body of the electric-operated valve is moved in the valve opening direction relative to the output shaft of the electric-operated motor by the pressure at the fuel tank side that is higher, by the predetermined value, than the valve opening pressure for the positive-pressure relief valve mechanism under a condition where the positive-pressure relief valve mechanism is out of order. Thus, the valve body is moved to the valve open position, so the pressure at the fuel tank side is released to the canister side.

In another aspect of this disclosure, the positive-pressure relief valve and the negative-pressure relief valve constitute a relief valve. The relief valve and the electric-operated valve are integrally housed in a valve casing to form a closing valve. According to this aspect, the electric-operated valve and the relief valve can be compactly put together as the closing valve.

In another aspect of this disclosure, the relief valve concentrically has the positive-pressure relief valve and the negative-pressure relief valve. The electric-operated valve and the relief valve are placed such that their axial directions are different from each other. According to this aspect, because the electric-operated valve and the relief valve are placed such that their axial directions are different from each other, the closing valve can be formed compactly compared with a closing valve in which the electric-operated valve and the relief valve are placed such that their axial directions are same with each other and such that the electric-operated valve and the relief valve are shifted from each other in the axial direction (refer to, e.g., Japanese Laid-Open Patent Publication No. 2012-524878).

In another aspect of this disclosure, the valve casing defines a main passage and a bypass passage. The main passage has a first valve opening, which is opened and closed by the electric-operated valve. The bypass passage bypasses the first valve opening and has a second valve opening, which is opened and closed by the relief valve. According to this aspect, because the main passage having the first valve opening and the bypass passage having the second valve opening are defined in the valve casing, the closing valve can be formed compactly.

In another aspect of this disclosure, the bypass passage has a predetermined passage sectional area and is communicated with the main passage. According to this aspect, increase in flow resistance of fluid in the bypass passage can be avoided.

In another aspect of this disclosure, the relief valve is disposed downstream of the second valve opening. According to this aspect, the second valve opening and the main passage can be positioned to be closer to each other than a case, e.g., where the relief valve is disposed upstream of the second valve opening, so the valve casing can be downsized.

In another aspect of this disclosure, the main passage has a first passage part and a second passage part. The first passage part extends in the same direction with an axial direction of the first valve opening. The second passage part extends in a different direction from an axial direction of the first passage part at a side of the first valve opening opposite to the first passage part side. According to this aspect, compared with a case, e.g., where the axial direction of the electric-operated valve and the axial direction of the main passage formed in a linear shape intersect at a right angle, the size of the main passage in the axial direction of the second passage part can be decreased, so the closing valve can be formed compactly.

In another aspect of this disclosure, the closing valve is mounted on a vehicle such that an axis of the relief valve extends in the vertical direction. According to this aspect, changes in a valve opening pressure of the relief valve can be suppressed. Furthermore, because the size of the closing valve in a direction along the axial direction of the relief valve, i.e., the vertical side of the closing valve is small, the closing valve can be placed at a vertically small space below the floor of the vehicle or the like. Thus, the degree of freedom of mounting the closing valve on the vehicle can be increased.

DETAILED DESCRIPTION

Embodiments of the present disclosure will be described below with reference to the drawings.

First Embodiment

Figure 1:
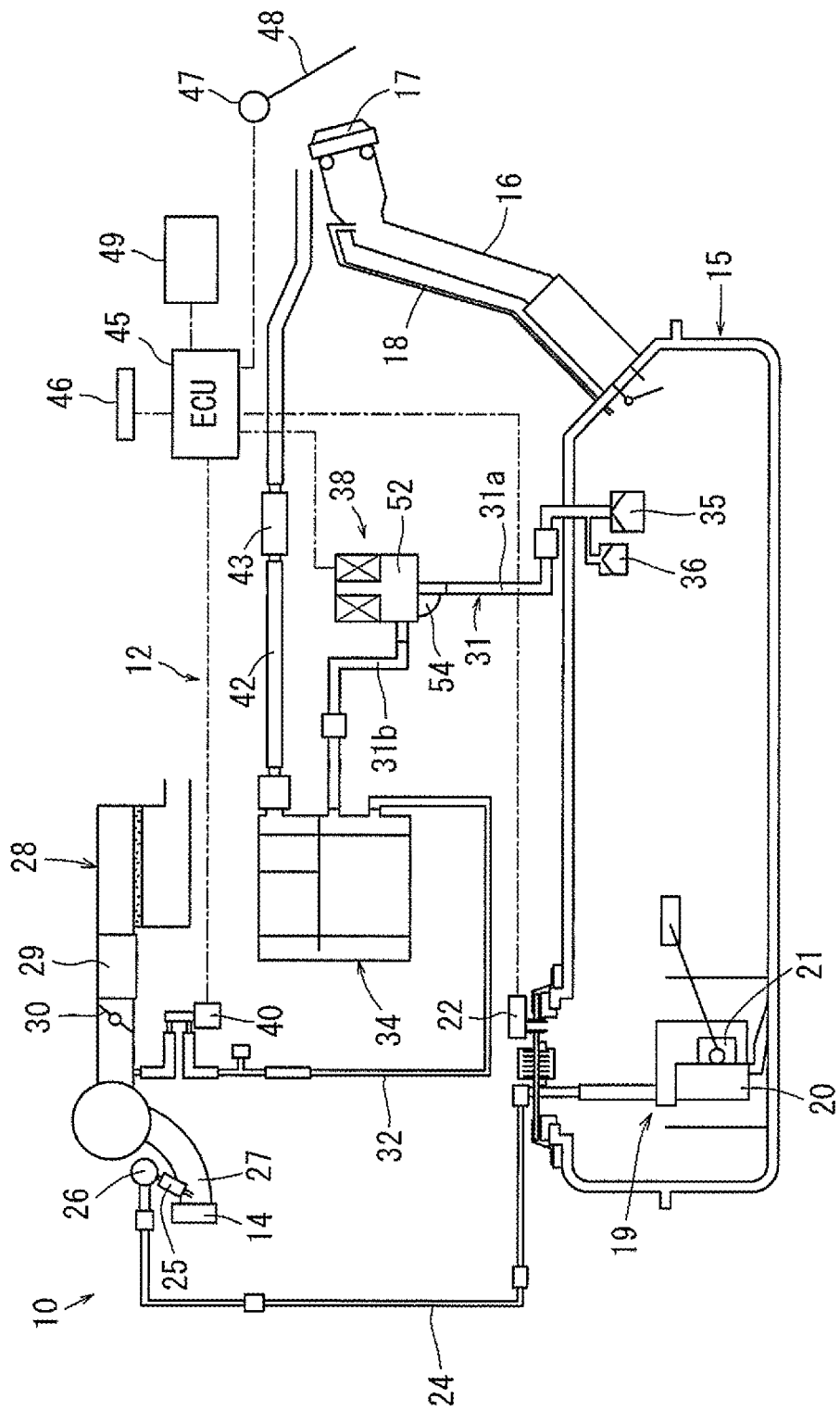
FIG. 1 is a schematic view of an evaporated fuel treatment device according to a first embodiment.

A first embodiment is one example of an evaporated fuel treatment device that is mounted on a vehicle, such as an automobile equipped with an internal combustion engine (i.e., engine). The vehicle has the internal combustion engine (engine) and a fuel tank. FIG. 1 is a schematic view of the evaporated fuel treatment device.

As shown in FIG. 1, an engine system 10 for a vehicle, such as automobile, includes an evaporated fuel treatment device 12. The engine system 10 has an engine 14 and a fuel tank 15. The fuel tank 15 stores liquid fuel to be supplied to the engine 14. The fuel tank 15 is provided with an inlet pipe 16. The inlet pipe 16 has a fill opening at an upper end part thereof and is configured to introduce liquid fuel from the fill opening into the fuel tank 15. A tank cap 17 is attached to the fill opening in a removable manner. An inner space of the upper end part of the inlet pipe 16 is communicated with a gaseous layer in the fuel tank 15 via a breather pipe 18.

A fuel supply device 19 is installed in the fuel tank 15. The fuel supply device 19 is composed of some components including a fuel pump 20, a sender gauge 21 and a tank internal pressure sensor 22. The fuel pump 20 suctions the liquid fuel stored in the fuel tank 15, and then pressurizes and discharges it. The sender gauge 21 detects a liquid level of the liquid fuel. The tank internal pressure sensor 22 detects a tank internal pressure as a relative pressure to the atmospheric pressure. The liquid fuel pumped up from the fuel tank 15 by the fuel pump 20 is injected into the engine 14 via a fuel supply passage 24. In more detail, the liquid fuel is supplied to a delivery pipe 26 having injectors (fuel injection valves) 25 corresponding to individual combustion chambers, and then is injected into an air intake passage 27 from the injectors 25. The air intake passage 27 is provided with an air cleaner 28, an air flow meter 29, a throttle valve 30, etc.

The evaporated fuel treatment device 12 includes a vapor passage 31, a purge passage 32 and a canister 34. One end (upstream end) of the vapor passage 31 is communicated with the gaseous layer in the fuel tank 15. The other end (downstream end) of the vapor passage 31 is communicated with an inner space of the canister 34. One end (upstream end) of the purge passage 32 is communicated with the inner space of the canister 34. The other end (downstream end) of the purge passage 32 is communicated with the air intake passage 27 downstream of the throttle valve 30. The canister 34 is filled with an activated carbon (not shown) as an adsorbent. The evaporated fuel in the fuel tank 15 is adsorbed on the adsorbent (activated carbon) in the canister 34 via the vapor passage 31.

In the gaseous layer in the fuel tank 15, the upstream end of the vapor passage 31 is provided with an On Board Refueling Vapor Recovery valve (ORVR valve) 35 and a fuel cut off valve (Cut Off Valve) 36. The ORVR valve 35 is a full tank regulating valve composed of a float valve, which opens and closes depending on its buoyancy in the liquid fuel. When the fuel level in the fuel tank 15 is lower than a full tank liquid level, the ORVR valve 35 is open. When the fuel level increases to the full tank liquid level by fuel feeding, the float valve closes to block the vapor passage 31. The inlet pipe 16 is filled with the liquid fuel after blocking the vapor passage 31 with the ORVR valve 35, so an automatic stop mechanism of an oil feeding gun operates in order to stop fuel feeding. The fuel cut off valve 36 is composed of a float valve, which opens and closes depending on its buoyancy in the liquid fuel, and is usually kept in an open state. The fuel cut off valve 36 closes upon a roll of the vehicle in order to prevent the liquid fuel in the fuel tank 15 from flowing into the vapor passage 31.

A closing valve 38 is disposed in the middle of the vapor passage 31. In more detail, the vapor passage 31 is divided at the middle thereof into a passage part 31a at the fuel tank 15 side and a passage part 31b at the canister 34 side such that the closing valve 38 is placed between the passage parts 31a and 31b. The closing valve 38 includes an electric-operated valve 52 and a relief valve 54. The electric-operated valve 52 opens and closes a passage based on an electrical control in order to regulate the flow rate of gas containing the evaporated fuel (referred to as "fluid") that flows through the vapor passage 31. The electric-operated valve 52 is controlled to open and close based on drive signals that are output from an engine control unit (referred to as "ECU" hereinafter) 45. The relief valve 54 is provided in the middle of a bypass passage (described below) bypassing the electric-operated valve 52. The relief valve 54 is configured to keep an internal pressure of the fuel tank 15 at a proper pressure value under a condition where the electric-operated valve 52 is in a closed state. The closing valve 38 will be described below.

A purge valve 40 is provided in the middle of the purge passage 32. The purge valve 40 is controlled to close and open at a valve opening amount corresponding to a purge flow rate calculated by the ECU 45. In this way the purge valve 40 is operated for purge control. For example, the purge valve 40 is provided with a stepping motor and controls a stroke of a valve body to adjust the valve opening amount. The purge valve 40 may be composed of a solenoid valve, which includes an electromagnetic solenoid and is configured to be closed in a non-energized state and to be opened by energization.

The canister 34 is connected with an atmospheric passage 42. The other end of the atmospheric passage 42 is open to the atmosphere. An air filter 43 is provided in the middle of the atmospheric passage 42.

The ECU 45 is connected with a lid switch 46, a lid opener 47, a display 49 and other components in addition to the tank internal pressure sensor 22, the electric-operated valve 52 of the closing valve 38 and the purge valve 40. The lid opener 47 is connected with a manual lid opening and closing device (not shown) for manually opening and closing a lid 48 that covers the fill opening. The lid switch 46 outputs signals for unlocking the lid 48 to the ECU 45. The lid opener 47 is a locking mechanism for the lid 48. The lid opener 47 is configured to unlock the lid 48 when the lid opener 47 receives the signal to release the lock from the ECU 45 or when opening operation of the manual lid opening and closing device is carried out. The tank internal pressure sensor 22 corresponds to "tank internal pressure detection device" in this description. The ECU 45 corresponds to "control device" in this description.

Next, a basic operation of the evaporated fuel treatment device 12 will be described. In a normal state, the relief valve 54 of the closing valve 38 is closed.

(1) During Vehicle Parking

During vehicle parking, the electric-operated valve 52 of the closing valve 38 is kept in the closed state. Thus, the evaporated fuel in the fuel tank 15 does not flow into the canister 34. And, the air in the canister 34 does not flow into the fuel tank 15. In this state, the purge valve 40 is held at the closed state. Under a condition where the electric-operated valve 52 is closed during parking or the like, the pressure in the fuel tank 15 is kept at an appropriate pressure value by the relief valve 54 of the closing valve 38 (described below).

(2) During Vehicle Driving

When a predetermined requirement for purge operation is met during vehicle driving, the ECU 45 executes a purge control for purging the evaporated fuel from the canister 34. During this operation, the purge valve 40 is controlled to be open and closed. When the purge valve 40 is opened, the negative pressure in the engine 14 is applied to the interior of the canister 34 via the purge passage 32. Thus, the evaporated fuel in the canister 34 is purged to the air intake passage 27 together with the air suctioned through the atmospheric passage 42, and then is burned in the engine 14. Furthermore, the ECU 45 keeps the electric-operated valve 52 of the closing valve 38 in the open state only during the purge operation for the evaporated fuel. Thus, the tank internal pressure of the fuel tank 15 is kept at a value close to the atmospheric pressure.

(3) During Fuel Feeding

When the lid switch 46 is operated during parking, the ECU 45 switches the electric-operated valve 52 of the closing valve 38 to the open state. At that time, when the tank internal pressure of the fuel tank 15 is higher than the atmospheric pressure, the evaporated fuel in the fuel tank 15 flows into the canister 34 via the vapor passage 31 and is adsorbed on the adsorbent in the canister 34 as soon as the electric-operated valve 52 of the closing valve 38 is opened. So, the evaporated fuel can be prevented from flowing into the atmosphere. As a result, the tank internal pressure of the fuel tank 15 decreases to a value close to the atmospheric pressure. When the tank internal pressure of the fuel tank 15 decreases to the value close to the atmospheric pressure, the ECU 45 outputs signal to the lid opener 47 for unlocking the lid 48. Upon receiving the signal, the lid opener 47 unlocks the lid 48 such that the lid 48 can be opened. Then, under a condition where the lid 48 is open and where the tank cap 17 is removed, fuel feeding to the fuel tank 15 is started. The ECU 45 keeps the electric-operated valve 52 of the closing valve 38 in the open state until the completion of fuel feeding (in more detail, until the lid 48 is closed). Accordingly, the evaporated fuel in the fuel tank 15 is adsorbed on the adsorbent in the canister 34 via the vapor passage 31 during fuel feeding.

Figure 2:
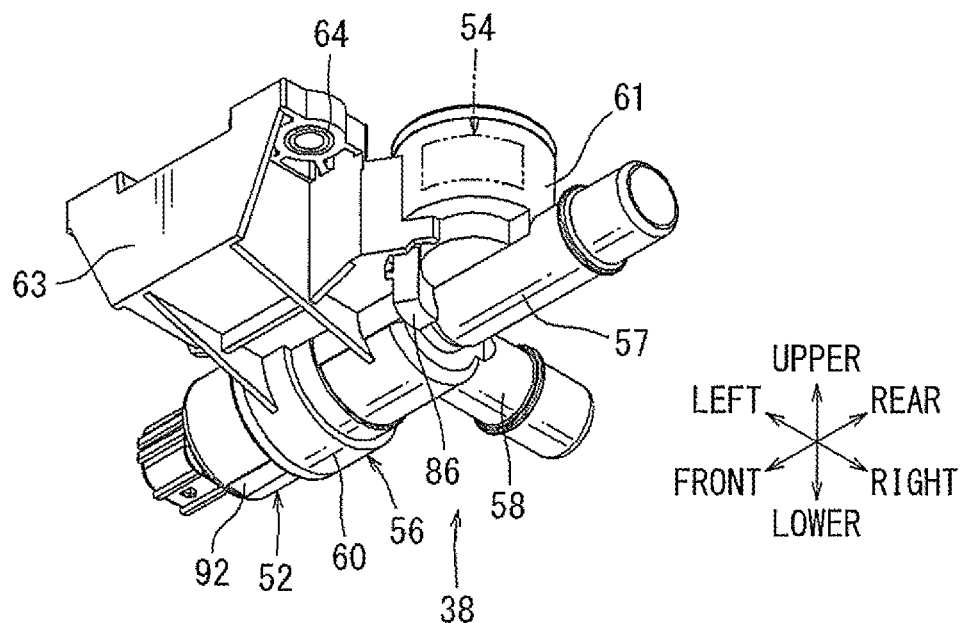
FIG. 2 is a perspective view of a closing valve.
Figure 3:
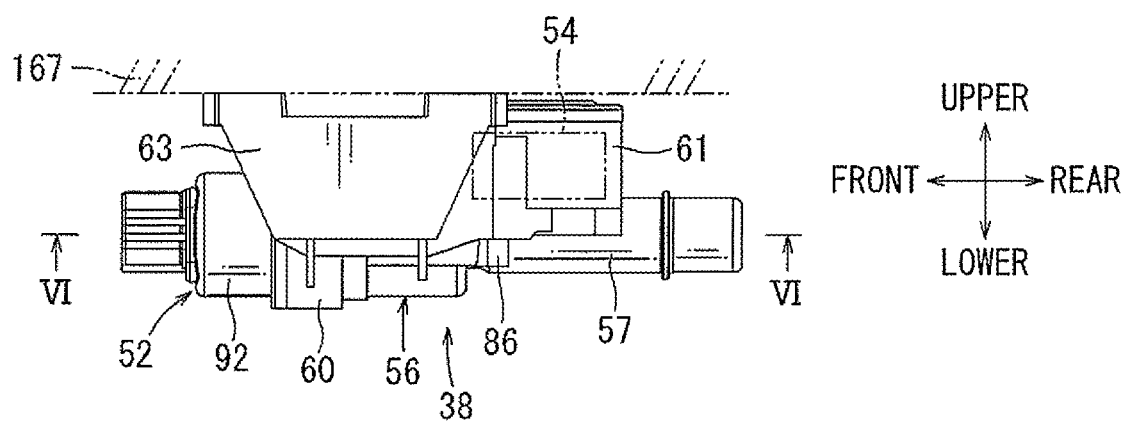
FIG. 3 is a left side view of the closing valve.
Figure 4:
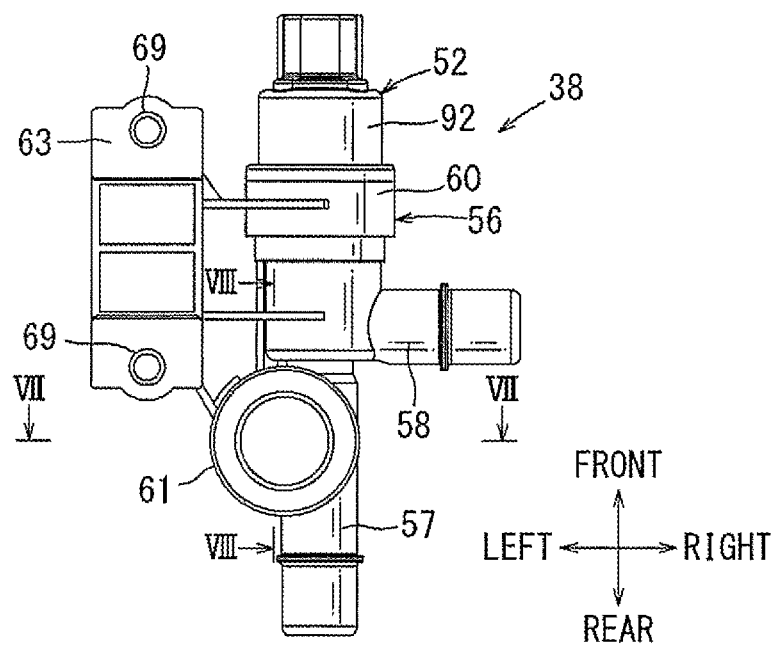
FIG. 4 is a top view of the closing valve.
Figure 5:
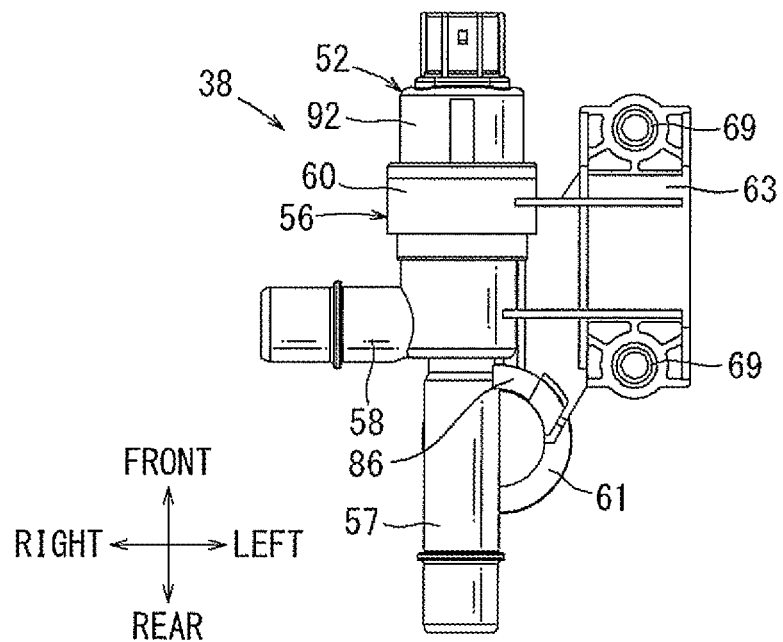
FIG. 5 is a bottom view of the closing valve.
Figure 6:
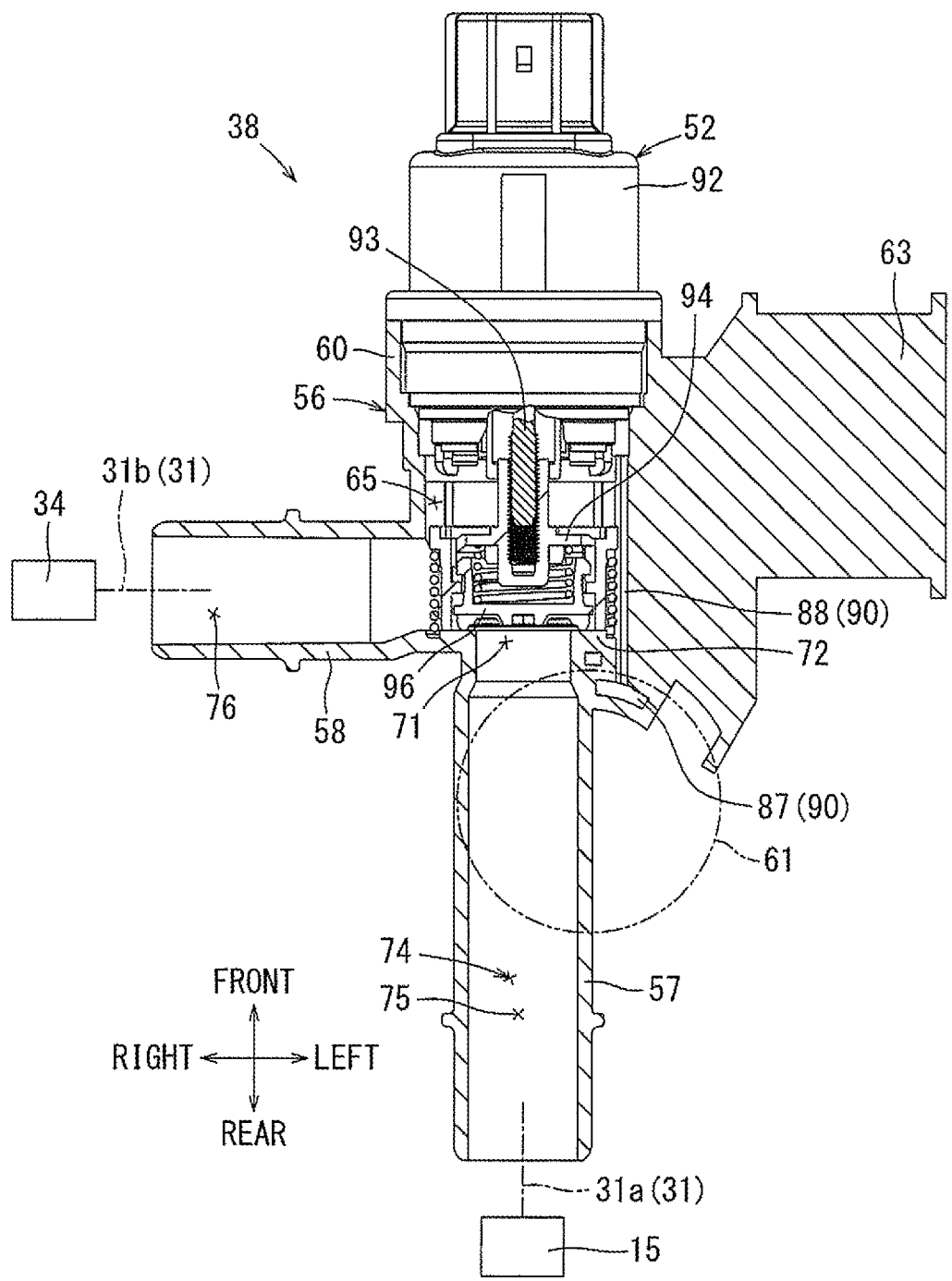
FIG. 6 is a cross-sectional view along VI-VI line shown in FIG. 3.
Figure 7:
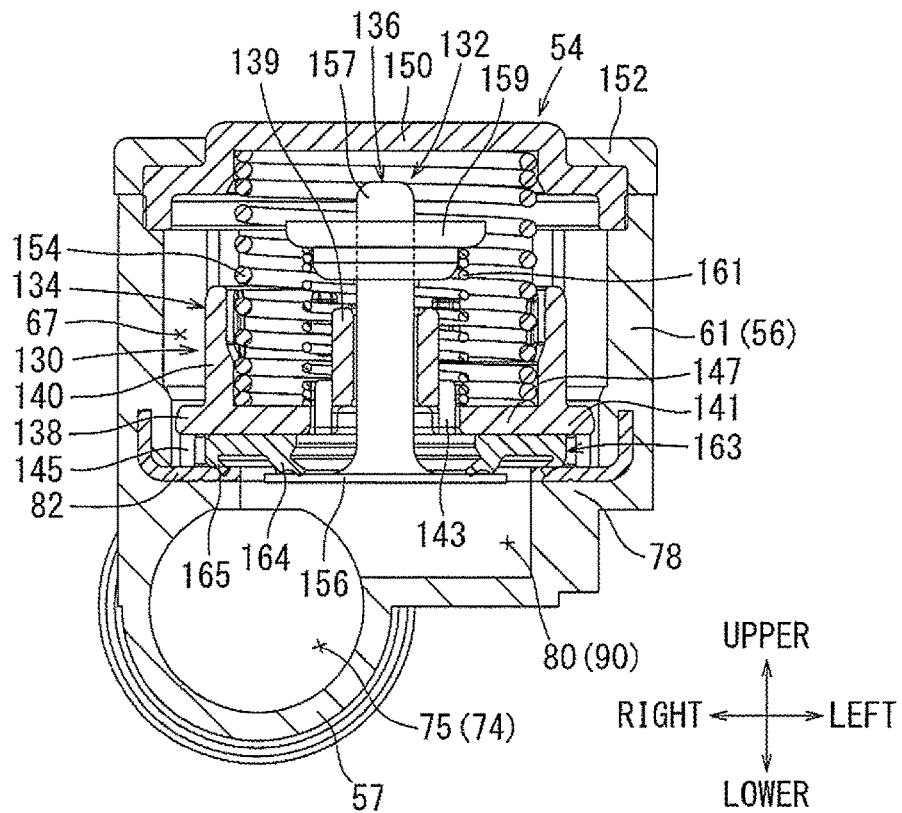
FIG. 7 is a cross-sectional view along VII-VII line shown in FIG. 4.
Figure 8:
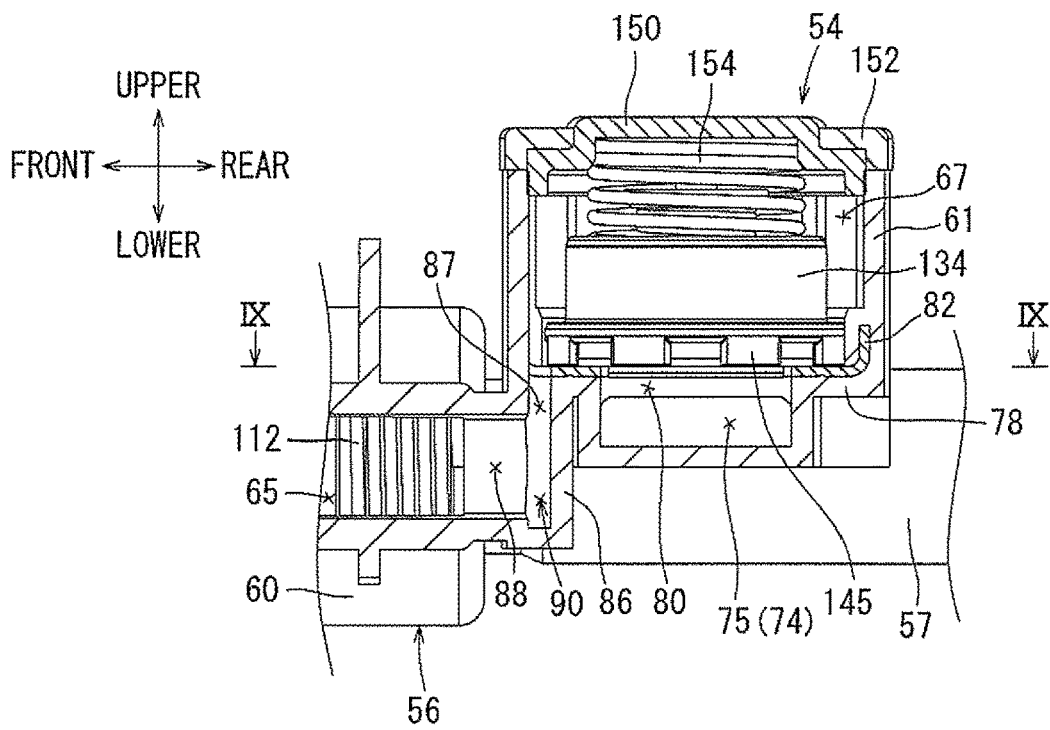
FIG. 8 is a cross-sectional view along VIII-VIII line shown in FIG. 4.
Figure 9:
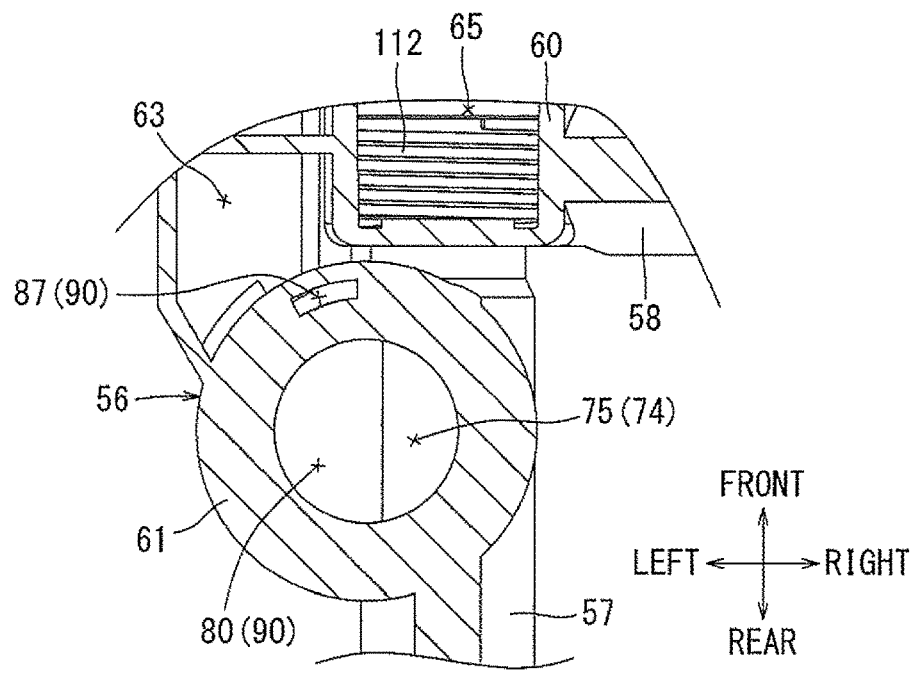
FIG. 9 is a cross-sectional view along IX-IX line shown in FIG. 8.

Next, the closing valve 38 will be described. FIG. 2 is a perspective view of the closing valve. FIG. 3 is a left side view of the same. FIG. 4 is a top view of the same. FIG. 5 is a bottom view of the same. FIG. 6 is a cross-sectional view along VI-VI line shown in FIG. 3. FIG. 7 is a cross-sectional view along VII-VII line shown in FIG. 4. FIG. 8 is a cross-sectional view along VIII-VIII line shown in FIG. 4. FIG. 9 is a cross-sectional view along IX-IX line shown in FIG. 8. Because the closing valve 38 is configured to be disposed, for example, below a floor of the vehicle, directions thereof in the drawings are defined based on front, rear, right, left, upper and lower directions of the vehicle. However, the directions do not limit actual mounting directions of the closing valve 38. The closing valve 38 corresponds to "flow control valve" in this description.

As shown in FIG. 2, the closing valve 38 includes a valve casing 56, which houses the electric-operated valve 52 and the relief valve 54 therein. The valve casing 56 is made from resin materials and has a first cylinder part 57, a second cylinder part 58, a first housing cylinder part 60, a second housing cylinder part 61 and an attachment part 63. The first cylinder part 57 is formed in a hollow cylindrical shape extending in the front-rear direction.

As shown in FIG. 6, the first housing cylinder part 60 is formed in a stepped cylindrical shape, of which the diameter increases in a stepwise manner from a front end part of the first cylinder part 57 (an upper end part in FIG. 6) in the forward direction (the upward direction in FIG. 6). The first cylinder part 57 and the first housing cylinder part 60 are concentrically formed. A first valve chamber 65 is formed in a rear end part of the first housing cylinder part 60. The second cylinder part 58 is formed in a hollow cylindrical shape extending from the first valve chamber 65 of the first housing cylinder part 60 in the rightward direction (the leftward direction in FIG. 6). The first housing cylinder part 60 corresponds to "electric-operated valve housing cylinder part" in this description.

As shown in FIG. 2, the second housing cylinder part 61 is formed at an upper portion of the front end part of the first cylinder part 57 (refer to FIG. 3). The second housing cylinder part 61 is a bottomed hollow cylindrical structure having an outer diameter approximately twice as much as an outer diameter of the first cylinder part 57 (refer to FIG. 5). The second housing cylinder part 61 is offset relative to the first cylinder part 57 in the leftward direction (the rightward direction in FIG. 5) by approximately a half of the outer diameter of the second housing cylinder part 61. A second valve chamber 67 is formed in the second housing cylinder part 61 (refer to FIG. 7). The second housing cylinder part 61 corresponds to "relief valve housing cylinder part" in this description.

As shown in FIG. 2, the attachment part 63 is formed in a block shape at a left portion of the first housing cylinder part 60 (refer to FIG. 4). The attachment part 63 has an upper surface as an attachment surface and a pair of collars 69 such that the collars 69 are buried in both front and rear end parts of the upper surface, respectively. Each of the collars 69 is made from a metal material and is formed in a cylindrical shape. The collars 69 are positioned such that the axis of each collar 69 extends vertically. A rear end part of the attachment part 63 is coupled to the second housing cylinder part 61.

As shown in FIG. 6, the first cylinder part 57 and the second cylinder part 58 are formed to be the same or nearly the same in pipe diameter. Internal spaces of the cylinder parts 57 and 58 are communicated with each other via the first valve chamber 65. An opening part of the cylinder part 57 at the first valve chamber 65 side is a first valve opening 71. The first valve opening 71 is shaped to have an inner diameter slightly smaller than an inner diameter of the first cylinder part 57. An opening edge part of the first valve opening 71 is a valve seat 72. In the first cylinder part 57, a first passage part 75 extends in the same direction with the axial direction of the first valve opening 71. In the second cylinder part 58, a second passage part 76 extends in a different direction from the axial direction of the first passage part 75 (the front-rear direction), that is, in the rightward direction (leftward in FIG. 6) at a side of the first valve opening 71 opposite to the first passage part 75 side (rear side), that is, at the front side (at the upper side in FIG. 6) of the first valve opening 71. The first passage part 75 and the second passage part 76 form a main passage 74 in an elbow shape.

As shown in FIG. 7, a lower end part of the second housing cylinder part 61 concentrically has a stepped part 78 to decrease an inner diameter thereof. A hollow space in the stepped part 78 is a second valve opening 80 communicated with the second valve chamber 67 in the second housing cylinder part 61. A wall part shared between the first cylinder part 57 and the second housing cylinder part 61 is penetrated in order to communicate the second valve opening 80 with the first passage part 75 (refer to FIGS. 8 and 9). A valve seat 82, which is made from a metal material and is formed in an annular disk shape, is concentrically disposed on an end surface (an upper end surface) of the stepped part 78 at the second valve chamber 67 side. An inner diameter of the valve seat 82 is set to be the same or nearly the same with an inner diameter of the stepped part 78. An outer circumferential part of the valve seat 82 is buried in the second housing cylinder part 61.

As shown in FIG. 8, a vertical passage part 87 extending in the vertical direction is defined in a front end part of the second housing cylinder part 61. An upper end part of the vertical passage part 87 is communicated with the second valve chamber 67. The vertical passage part 87 penetrates the valve seat 82. A horizontal passage part 88 extending in the front-rear direction is defined in a left end part (a right end part in FIG. 6) of the first housing cylinder part 60. A front end part (a left end part in FIG. 8) of the horizontal passage part 88 is communicated with the first valve chamber 65. A rear end part (a right end part in FIG. 8) of the horizontal passage part 88 is communicated with a lower end part of the vertical passage part 87. A connection wall part 86 defining a connection part between the passage parts 87 and 88 is formed between a bottom wall part (a rear wall part) of the first housing cylinder part 60 and a bottom wall part (a lower wall part) of the second housing cylinder part 61 in a bulged shape (refer to FIG. 2). The second valve opening 80, the second valve chamber 67, the vertical passage part 87, the horizontal passage part 88 and the first valve chamber 65 constitute a bypass passage 90 (refer to FIGS. 7 and 8) for bypassing the first valve opening 71 (refer to FIG. 6).

The vertical passage part 87 is formed to have an arc-shaped cross-section along an internal surface of the second housing cylinder part 61 (refer to FIGS. 6 and 9). Thus, a passage sectional area required for the vertical passage part 87 is secured while preventing increase in an outer diameter of the second housing cylinder part 61. The horizontal passage part 88 is formed to have an arc-shaped cross-section along an internal surface of the first housing cylinder part 60 in a similar manner to the vertical passage part 87. Thus, a passage sectional area required for the horizontal passage part 88 is secured while preventing increase in an outer diameter of the first housing cylinder part 60. Accordingly, the bypass passage 90 is communicated with the main passage 74 as its passage sectional area is secured.

Figure 10:
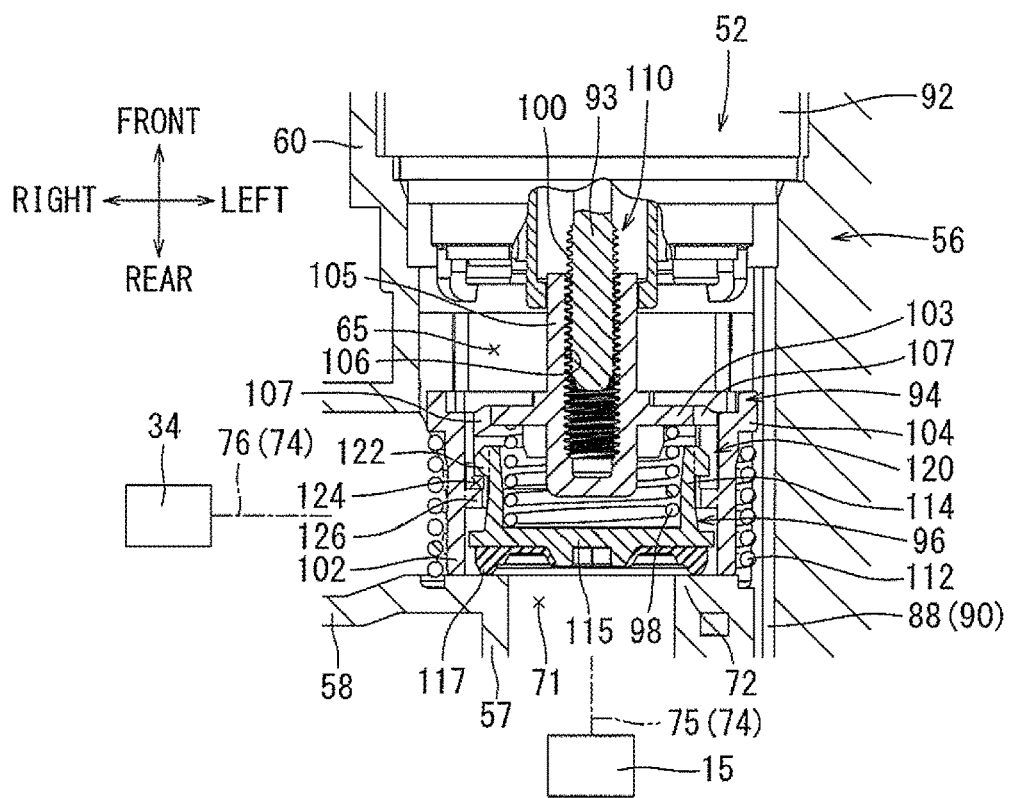
FIG. 10 is a cross-sectional view of an electric-operated valve in a closed state.
Figure 11:
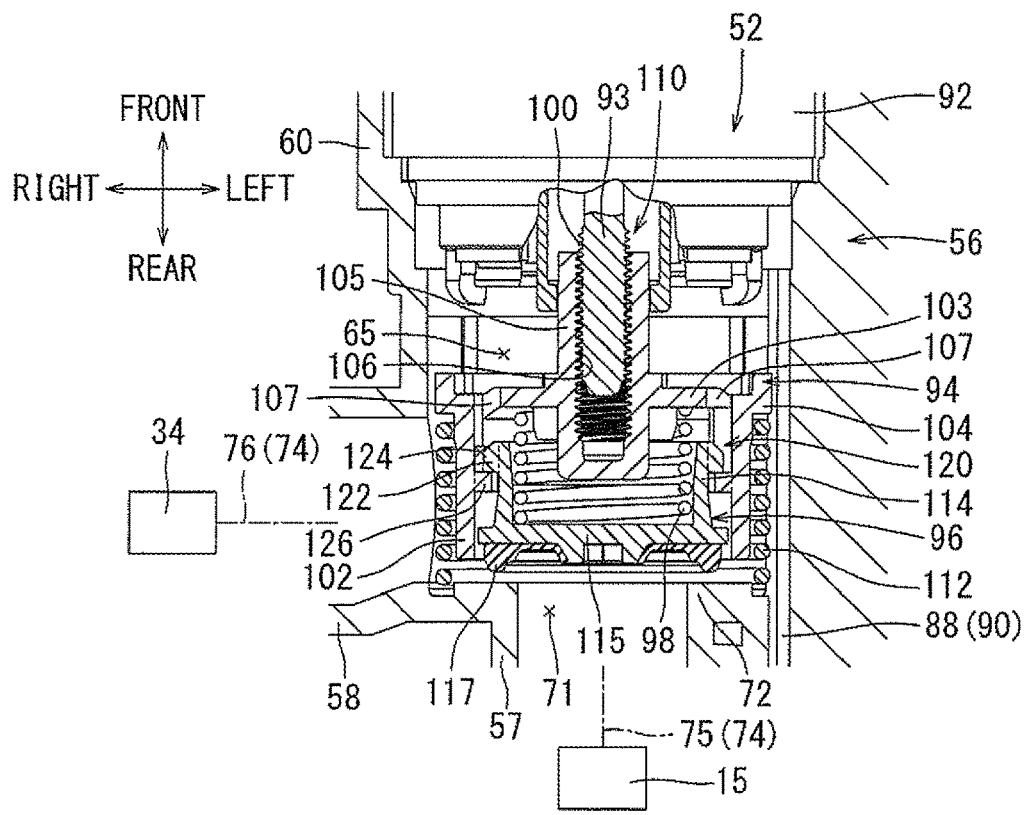
FIG. 11 is a cross-sectional view of the electric-operated valve in an open state.
Figure 12:
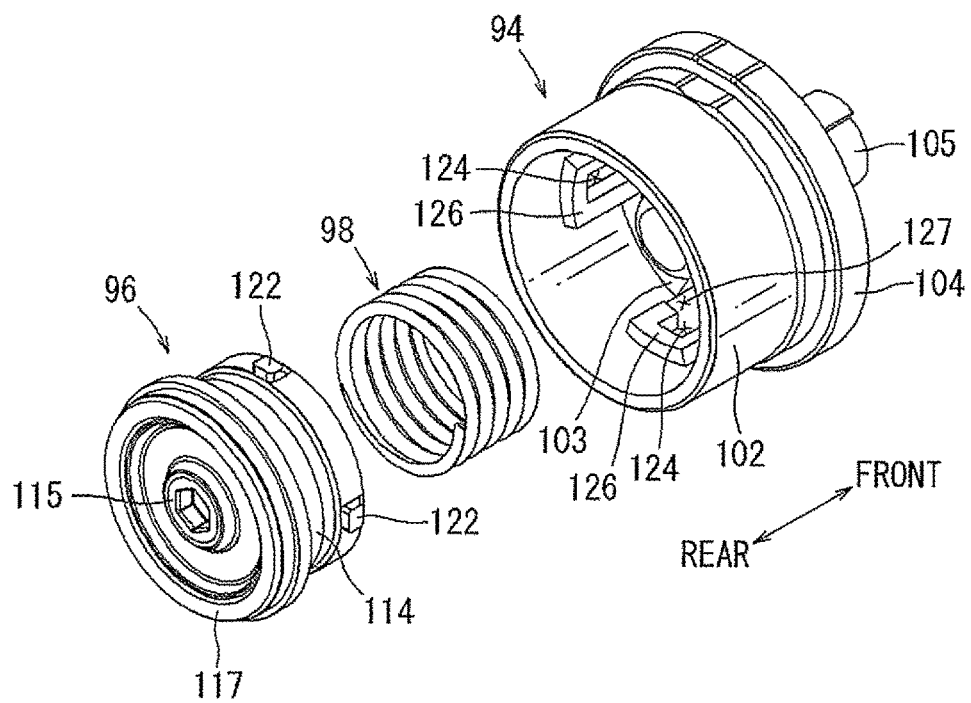
FIG. 12 is an exploded perspective view of a valve body, a valve spring and a valve guide.

Next, the electric-operated valve 52 will be described. FIG. 10 is a cross-sectional view of the electric-operated valve in a closed state. FIG. 11 is a cross-sectional view of the electric-operated valve in an open state. FIG. 12 is an exploded perspective view of a valve body, a valve spring and a valve guide. As shown in FIG. 10, the electric-operated valve 52 is housed in the first housing cylinder part 60 of the valve casing 56. The electric-operated valve 52 includes a stepping motor 92, a valve guide 94, a valve body 96 and a valve spring 98.

The stepping motor 92 is installed in the first housing cylinder part 60 such that the axis of the stepping motor 92 extends in the front-rear direction (the vertical direction in FIG. 10). The stepping motor 92 has an output shaft 93 capable of rotating in both forward and reverse directions. The output shaft 93 is directed rearward (downward in FIG. 10) and is concentrically disposed in the first valve chamber 65 of the first housing cylinder part 60. A male screw part 100 is formed at an outer circumferential surface of the output shaft 93. The stepping motor 92 corresponds to "electric-operated motor" in this description.

As shown in FIG. 12, the valve guide 94 contains a cylinder wall part 102 formed in a hollow cylindrical shape and an end wall part 103 closing a front end opening of the cylinder wall part 102. A front end part of the cylinder wall part 102 is provided with a bulged part 104 formed in a stepped cylindrical shape to increase an outer diameter thereof. A center of the end wall part 103 is concentrically provided with a cylindrical shaft part 105, which is formed in a hollow cylindrical shape. A rear end part of the cylindrical shaft part 105 is closed. As shown in FIG. 10, a female screw part 106 is formed at an inner circumferential surface of the cylindrical shaft part 105. A plurality of through holes 107 are formed at the end wall part 103 and are arranged at regular intervals in a circumferential direction.

The valve guide 94 is disposed in a movable manner relative to the first valve chamber 65 in the axial direction, that is, the front-rear direction (the vertical direction in FIG. 10). The valve guide 94 is prevented from rotating about its axis by a locking mechanism (not shown) relative to a surrounding wall part defining the first valve chamber 65 (i.e., the first housing cylinder part 60). The bulged part 104 of the valve guide 94 is loosely fitted with an internal surface of the first valve chamber 65 with a predetermined gap in between. The female screw part 106 of the cylindrical shaft part 105 is engaged with the male screw part 100 of the output shaft 93 of the stepping motor 92 by screw fixation. Thus, the valve guide 104 moves in the axial direction (the front-rear direction) depending on the forward and reverse rotations of the output shaft 93. The male screw part 100 of the output shaft 93 and the female screw part 106 of the valve body 96 constitute a feed screw mechanism 110.

An auxiliary spring 112 composed of a coil spring is disposed between the valve seat 72 of the valve casing 56 and the bulged part 104 of the valve guide 94. The auxiliary spring 112 is fitted into the cylinder wall part 102. The auxiliary spring 112 constantly energizes the valve guide 94 forward (upward in FIG. 10) in order to prevent backlash in the feed screw mechanism 110. A rear end surface of the cylinder wall part 102 faces the valve seat 72 to be capable of abutting on the valve seat 72.

As shown in FIG. 12, the valve body 96 contains a cylindrical part 114 formed in a hollow cylindrical shape and a valve plate part 115 closing a rear opening of the cylindrical part 114. The valve plate part 115 is attached with a first seal member 117 that is made from a rubber-like elastic material in a ring shape.

As shown in FIG. 10, the valve body 96 is concentrically placed in the valve guide 94 in a movable manner in the front-rear direction (the vertical direction in FIG. 10). The first seal member 117 faces the valve seat 72 to be capable of abutting on the valve seat 72. A plurality of (e.g., four) coupling mechanisms 120 are provided between the valve guide 94 and the valve body 96 for coupling the members 94 and 96 to one another in a movable manner in the axial direction (the front-rear direction) within a predetermined range. The coupling mechanism 120 are arranged at regular intervals in the circumferential direction. Each of the coupling mechanisms 120 is composed of an engaging projection 122 formed at the cylindrical part 114 of the valve body 96 and an engaged groove 124 formed at the cylinder wall part 102 of the valve guide 94.

As shown in FIG. 12, the engaging projections 122 protrude radially outward from a front end part of an outer circumferential surface of the cylindrical part 114 of the valve body 96. The engaged grooves 124 are defined by groove defining walls 126 protruding from an internal surface of the cylinder wall part 102 of the valve guide 94. Each of the groove defining walls 126 is formed in a nearly U-shape to define the engaged groove 124, which is open toward an internal space of the cylinder wall part 102 and extends in the front-rear direction. One of side wall parts of each groove defining wall 126 extends to the end wall part 103. The other of the side wall parts of each groove defining wall 126 and the end wall part 103 define an opening part 127 therebetween. Each of the engaging projections 122 is passed through the opening part 127 of the corresponding groove defining wall 126 and then is engaged in the engaged groove 124. Thus, the valve body 96 is coupled to the valve guide 94 in a relatively movable manner in the axial direction (the front-rear direction) within a predetermined moving amount under a condition where the valve body 96 is prevented from rotating in the circumferential direction relative to the valve guide 94 (refer to FIG. 10). The engaging projection 122 corresponds to "coupling projecting part" in this description. The engaged groove 124 corresponds to "coupling recessed part" in this description.

As shown in FIG. 10, the valve spring 98 is composed of a coil spring (refer to FIG. 12). The valve spring 98 is concentrically disposed between the end wall part 103 of the valve guide 94 and the valve plate part 115 of the valve body 96. The valve spring 98 constantly energizes the valve body 96 rearward (downward in FIG. 10) relative to the valve guide 94, that is, in a closing direction. The valve spring 98 corresponds to "valve body energizing member" in this description.

Next, the relief valve 54 will be described. FIG. 7 shows a positive-pressure relief valve mechanism and a negative-pressure relief valve mechanism, each of which is in a closed state. As shown in FIG. 7, the relief valve 54 is housed in the second housing cylinder part 61 of the valve casing 56. The relief valve 54 concentrically has a positive-pressure relief valve mechanism 130 and a negative-pressure relief valve mechanism 132. A first valve member 134 of the positive-pressure relief valve mechanism 130 and a second valve member 136 of the negative-pressure relief valve mechanism 132 are concentrically arranged in the second valve chamber 67 of the second housing cylinder part 61 in a vertically movable manner.

The first valve member 134 concentrically has a valve plate 138 formed in an annular disk shape, an inner cylindrical part 139 and an outer cylindrical part 140. The inner cylindrical part 139 is placed in the outer cylindrical part 140 to form an internal and external double cylinder structure. An outer circumferential part of the valve plate 138 is a first valve part 141 corresponding to the valve seat 82 of the second housing cylinder part 61. When the first valve part 141 moves upward away from the valve seat 82, the second valve opening 80 is open. Then, when the first valve part 141 moves to abut on the valve seat 82, the second valve opening 80 is closed. The valve seat 82 corresponds to "first valve seat" in this description.

The inner cylindrical part 139 and the outer cylindrical part 140 are formed to stand on the valve plate 138. A plurality of (two shown in FIG. 7) communication holes 143 are formed in a connection portion of the valve plate 138 and the inner cylindrical part 139 such that each of the communication holes 143 penetrates both the valve plate 138 in the vertical direction and the inner cylindrical part 139 in the radial direction. A lower surface of an outer edge part of the first valve part 141 are provided with a plurality of stoppers 145 arranged at regular intervals in the circumferential direction (refer to FIG. 8). When the first valve member 134 is in the valve closed state, the stoppers 145 abut on the valve seat 82.

As a result, the closed position of the first valve member 134 is defined. An inner circumferential part of the valve plate 138 is a valve seat 147 of the negative-pressure relief valve mechanism 132.

An upper open end part of the second housing cylinder part 61 is provided with a cap 150 and a retaining member 152. The cap 150 is made from a resin material and is formed in a disk shape. The cap 150 is fitted into the upper open end part of the second housing cylinder part 61 to close there. The retaining member 152 is made from a resin material and is formed in an annular shape. The retaining member 152 is bonded to an upper end part of the second housing cylinder part 61 by welding or the like. The retaining member 152 is engaged with an outer circumferential part of the cap 150. Thus, the retaining member 152 prevents the cap 150 from detaching therefrom.

A first coil spring 154 is concentrically disposed between mutually facing surfaces of the valve plate 138 of the first valve member 134 and the cap 150. The first coil spring 154 energizes the first valve member 134 downward, i.e., in a closing direction. The first coil spring 154 is fitted in the outer cylindrical part 140 of the first valve member 134. The first coil spring 154 corresponds to "first energizing member".

The second valve member 136 has a valve plate 156 formed in a disk shape and a shaft part 157 formed in a round shaft shape. The shaft part 157 of the second valve member 136 is fitted into the inner cylindrical part 139 of the first valve member 134 from below. When the valve plate 156 moves downward away from the valve seat 147 of the first valve member 134, the communication holes 143 are open. Then, when the valve plate 156 moves to abut on the valve seat 147, the communication holes 143 are closed. An end part (an upper end part) of the shaft part 157 is provided with a spring support member 159 formed in an annular disk shape. When the second valve member 136 is in the open position, the spring support member 159 abuts on the inner cylindrical part 139 of the first valve member 134. Thus, the maximum open amount of the second valve member 136 is defined.

A second coil spring 161 is concentrically disposed between mutually facing surfaces of the valve plate 138 of the first valve member 134 and the spring support member 159. The inner cylindrical part 139 of the first valve member 134 is placed in the second coil spring 161. The second coil spring 161 energizes the second valve member 136 upward, that is, in the closing direction. The second coil spring 161 is placed in the first coil spring 154 to form an internal and external double cylinder structure. The coil diameter, the coil length and the wire thickness of the second coil spring 161 are set to be less than the coil diameter, the coil length and the wire thickness of the first coil spring 154. Thus, the energizing force of the second coil spring 161 is less than that of the first coil spring 154. The second coil spring 161 corresponds to "second energizing member" in this description.

A second seal member 163, which is made from a rubber-like elastic material and is formed in an annular shape, is attached to a lower surface of the valve plate 138 of the first valve member 134 by adhesion or the like. The second seal member 163 has internal and external seal parts 164, 165, which are made from the rubber-like elastic material such as rubber and protrude from a lower surface side of the seal member 163 in an internal and external double ring structure. The internal seal part 164 faces the valve plate 156 of the second valve member 136. When the second valve member 136 is in the closed position, the second coil spring 161 energizes the second valve member 136 upward, so the valve plate 156 elastically contacts, i.e., tightly adheres to the internal seal part 164. Whereas, the external seal part 165 faces the valve seat 82 of the valve casing 56. When the first valve member 134 is in the closed position, the first coil spring 154 energizes the first valve member 134 downward, so the external seal part 165 elastically contacts, i.e., tightly adheres to the valve seat 82.

In the positive-pressure relief valve mechanism 130 (refer to FIG. 7), the valve opening pressure at the positive pressure side is defined by the first coil spring 154. When the pressure at the second valve opening 80 side (the pressure at the fuel tank side) is equal to or higher than the valve opening pressure at the positive pressure side, the first valve member 134 moves upward against energization by the first coil spring 154, so the positive-pressure relief valve mechanism 130 is opened (refer to FIG. 13). In this condition, the external seal part 165 is away from the valve seat 82 and is in a separate state.

In the negative-pressure relief valve mechanism 132 (refer to FIG. 7), the valve opening pressure at the negative pressure side is defined by the second coil spring 161. When the pressure at the second valve opening 80 side (the pressure at the fuel tank side) is equal to or lower than the valve opening pressure at the negative pressure side, the second valve member 136 moves downward against energization by the second coil spring 161, so the negative-pressure relief valve mechanism 132 is opened (refer to FIG. 14). In this condition, the internal seal part 164 is away from the valve plate 156 of the second valve member 136 and is in a separate state.

The closing valve 38 is placed in the middle of the vapor passage 31 of the evaporated fuel treatment device 12 (refer to FIG. 1), which is mounted on the vehicle (not shown). More specifically, as shown in FIG. 6, the first cylinder part 57 of the valve casing 56 is connected with the passage part 31a of the vapor passage 31 at the fuel tank 15 side. Whereas, the second cylinder part 58 is connected with the passage part 31b of the vapor passage 31 at the canister 34 side. Thus, the passage parts 31a and 31b of the vapor passage 31 are communicated with each other via the main passage 74 of the valve casing 56. That is, the main passage 74 corresponds to a part of the vapor passage 31. As shown in FIG. 3, the attachment part 63 of the valve casing 56 is fixed on a fixed side member 167 under the floor of the vehicle by fixation of a bolt or the like. Accordingly, the closing valve 38 is installed on the vehicle such that the axis of the relief valve 54 (refer to FIG. 7) extends in the vertical direction.

Next, the operation of the electric-operated valve 52 of the closing valve 38 will be described. The positive-pressure relief valve mechanism 130 and the negative-pressure relief valve mechanism 132 of the relief valve 54 are in the closed state (refer to FIG. 7) now.

(1) The Electric-Operated Valve 52 in the Open State

As shown in FIG. 11, when the electric-operated valve 52 is in the open state, the valve guide 94 and the valve body 96 (including the first seal member 117) are away from the valve seat 72 of the first housing cylinder part 60 in the forward direction (the upward direction in FIG. 11). The valve body 96 is energized rearward (downward in FIG. 11) relative to the valve guide 94 due to elastic force of the valve spring 98, so the engaging projections 122 of the valve body 96 abut on groove bottom parts of the engaged grooves 124 (i.e., front end parts of the groove defining walls 126) of the valve guide 94. Thus, the valve guide 94 and the valve body 96 are coupled with each other by the coupling mechanisms 120.

The stroke control of the valve guide 94 in the axial direction is performed via the feed screw mechanism 110 based on the driving control of the stepping motor 92 by the ECU 45 (refer to FIG. 1). Thus, the valve body 96 is moved together with the valve guide 94 in the front-rear direction (the vertical direction in FIG. 11) in order to control the valve opening amount (the lift) of the valve body 96. Even if the stepping motor 92 is turned off (in OFF state) under the open condition, the open condition can be kept due to various factors, such as the detent torque of the stepping motor 92 and the lead angle of the feed screw mechanism 110.

(2) During Valve Closing Operation of the Electric-Operated Valve 52

Under the condition where the electric-operated valve 52 is in the open state (refer to FIG. 11), when the closing operation of the stepping motor 92 is started, the output shaft 93 is rotated in the valve closing direction, so the valve guide 94 and the valve body 96 are moved rearward (downward in FIG. 11) via the feed screw mechanism 110. Thus, the valve body 96 (specifically, the first seal member 117) abuts on the valve seat 72, so the valve body 96 is prevented from moving rearward. Then, the valve guide 94 is moved rearward furthermore.

At that time, the groove bottom parts of the engaged grooves 124 (the front end parts of the groove defining walls 126) of the valve guide 94 move forward relative to the engaging projections 122 of the valve body 96. As a result, the coupling between the valve guide 94 and the valve guide 96 by the coupling mechanisms 120 is released.

Then, when the cylinder wall part 102 of the valve guide 94 is close to or abuts on the valve seat 72 of the valve casing 56, the ECU 45 stops the valve closing operation of the stepping motor 92 (refer to FIG. 10). This condition corresponds to the valve closed state. The valve guide 94 may be moved to a position close to the valve seat 72 by contacting the cylinder wall part 102 of the valve guide 94 with the valve seat 72 of the valve casing 56 and then moving the valve guide 94 forward by the predetermined amount.

(3) The Electric-Operated Valve 52 in the Closed State

When the electric-operated valve 52 is in the closed state (refer to FIG. 10), the valve body 96 is elastically kept to abut on the valve seat 72 of the valve casing 56 due to the energizing force of the valve spring 98. And, the first seal member 117 elastically seals between the valve body 96 and the valve seat 72. Even if the stepping motor 92 is turned off (in OFF state) under the closed condition, the closed state can be kept due to various factors, such as the detent torque of the stepping motor 92, and the lead angle of the feed screw mechanism 110.

(4) During Valve Opening Operation of the Electric-Operated Valve 52

Under the condition where the electric-operated valve 52 is in the closed state (refer to FIG. 10), when the opening operation of the stepping motor 92 is started, the output shaft 93 is rotated in the valve opening direction, so the valve guide 94 is moved forward (in the opening direction) via the feed screw mechanism 110. At that time, the engaged grooves 124 of the valve guide 94 move forward (upward in FIG. 10) along the engaging projections 122 of the valve body 96. And, the valve spring 98 and the auxiliary spring 112 extend due to their elastic restoring force. Then, the groove bottom parts of the engaged grooves 124 (the front end parts of the groove defining walls 126) abut on the engaging projections 122 of the valve body 96. Thus, relative movement between the valve guide 94 and the valve body 96 are regulated. Accordingly, the valve guide 94 and the valve body 96 are coupled to each other via the coupling mechanisms 120. Then, the valve guide 94 and the valve body 96 are moved forward (upward in FIG. 10) furthermore. At that time, the auxiliary spring 112 extends due to its elastic restoring force. As a result, the valve body 96 (specifically, the first seal member 117) is away from the valve seat 72 of the valve casing 56 and is in the valve open position (refer to FIG. 11).

Next, the operation of the relief valve 54 of the closing valve 38 will be described. Now, the electric-operated valve 52 of the closing valve 38 is in the closed state (refer to FIG.

Figure 13:
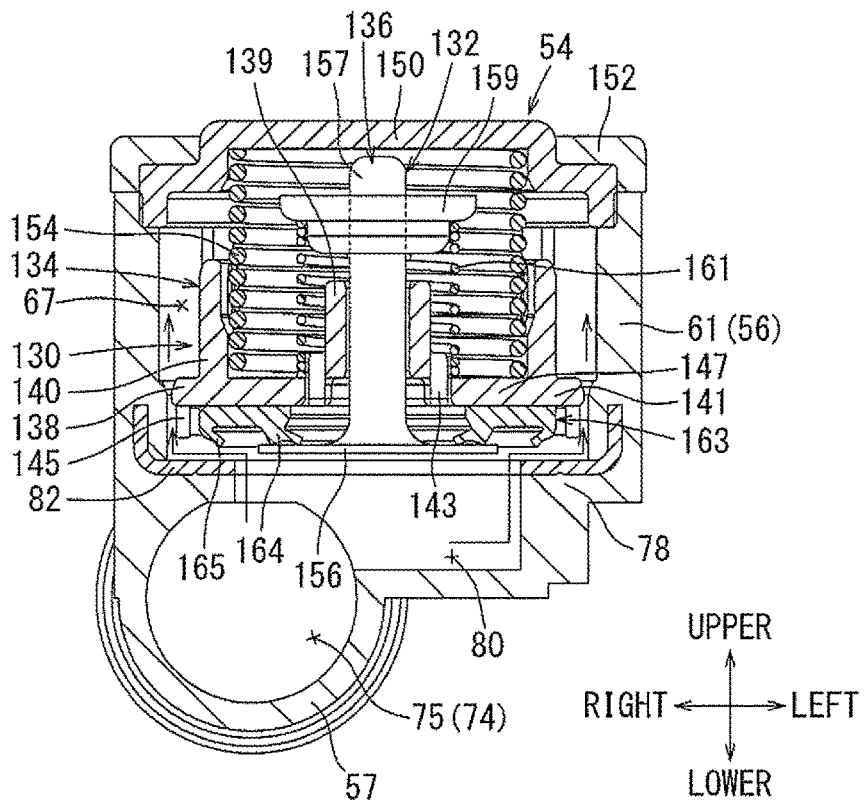
FIG. 13 is a front sectional view of a relief valve having a positive-pressure relief valve mechanism that is in an open state.

10) and that both of the relief valve mechanisms 130, 132 of the relief valve 54 are in the closed state (refer to FIG. 7). When a positive pressure equal to or higher than the valve opening pressure generates at the fuel tank 15 side under this condition, the positive-pressure relief valve mechanism 130 is opened (refer to FIG. 13), so the second valve opening 80 is communicated with the second valve chamber 67. Thus, fluid flowing from the fuel tank 15 side passes through the first passage part 75 and the bypass passage 90 (refer to FIG. 8), and then flows through the second passage part 76 toward the canister 34 side. As a result, the internal pressure of the fuel tank 15 decreases. Arrows in FIG. 13 show the flow of the fluid at that time.

Figure 14:
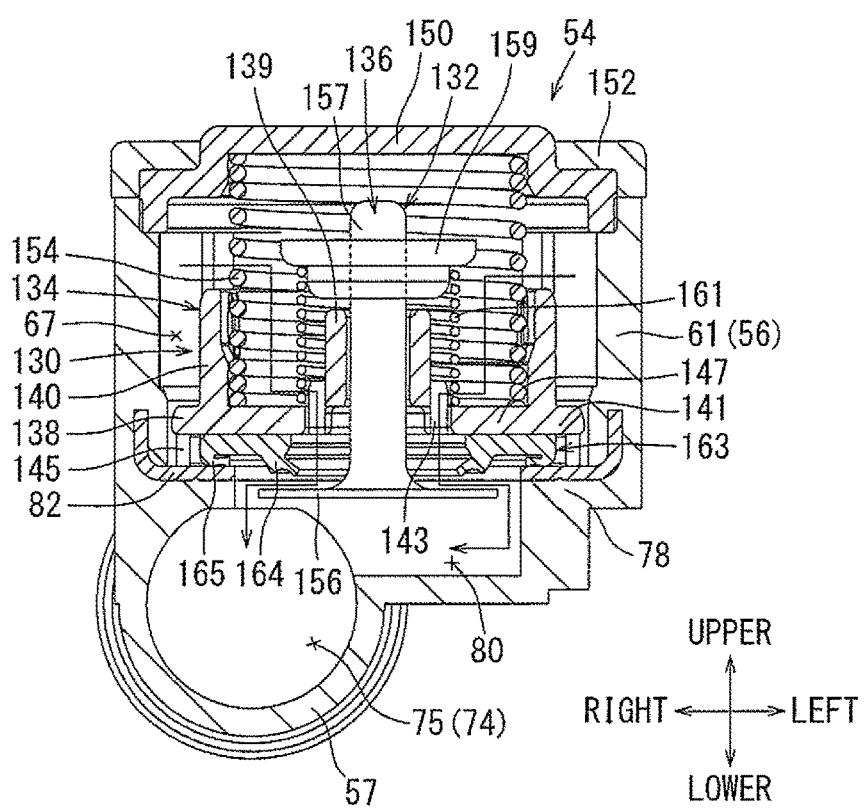
FIG. 14 is a front sectional view of the relief valve having a negative-pressure relief valve mechanism that is in an open state.

When a negative pressure equal to or lower than the valve opening pressure of the negative-pressure relief valve mechanism 132 generates at the fuel tank 15 side, the second valve member 136 is opened (refer to FIG. 14). Thus, fluid flowing from the canister 34 side passes through the second passage part 76 and the bypass passage 90, and then flows through the first passage part 75 toward the fuel tank 15 side. As a result, the internal pressure of the fuel tank 15 increases. Arrows in FIG. 14 show the flow of the fluid at that time.

Under a condition where the electric-operated valve 52 is in the closed state (refer to FIG. 10), the valve body 96 is elastically kept to abut on the valve seat 72 of the valve casing 56 due to the energizing force of the valve spring 98. When the pressure at the fuel tank 15 side is higher than the valve opening pressure of the positive-pressure relief valve mechanism 130 by the predetermined value upon a failure of the positive-pressure relief valve mechanism 130 of the relief valve 54 (refer to FIG. 7), the valve body 96 is moved in the opening direction (the forward direction) against the energizing force of the valve spring 98. Thus, the valve body 96 is shifted into the valve open position, so the pressure at the fuel tank 15 side is released to the canister 34 side. Accordingly, the pressure at the fuel tank 15 side can be prevented from increasing over an excessive pressure.

Under a condition where the electric-operated valve 52 is in the closed state (refer to FIG. 10), when the cylinder wall part 102 of the valve guide 94 abuts on the valve seat 72 of the valve casing 56, the fluid flows through a radial space between the valve guide 94 and the valve body 96 and the through holes 107 of the valve guide 94 in the forward direction (upward in FIG. 10), and then passes through a radial space between the surrounding wall of the first valve chamber 65 and the valve guide 94 in the rearward direction (downward in FIG. 10) to the second passage part 76, so the pressure at the fuel tank 15 side is released to the canister 34 side. Alternatively, under the condition where the electric-operated valve 52 is in the closed state (refer to FIG. 10), when the cylinder wall part 102 of the valve guide 94 is close to the valve seat 72 of the valve casing 56, the pressure at the fuel tank 15 side is released to the canister 34 side via a space between the cylinder wall part 102 and the valve seat 72.

According to the evaporated fuel treatment device 12 (refer to FIG. 1), the valve body 96 is elastically kept to abut on the valve seat 72 of the valve casing 56 due to the energizing force of the valve spring 98 under the condition where the electric-operated valve 52 is in the closed state (refer to FIG. 10). When the pressure at the fuel tank 15 side is higher than the valve opening pressure of the positive-pressure relief valve mechanism 130 by the predetermined value upon the failure of the positive-pressure relief valve mechanism 130 of the relief valve 54 (refer to FIG. 7), the valve body 96 is moved in the valve opening direction (forward) against energization by the valve spring 98. Thus, the valve body 96 is moved to the valve open position, so the pressure at the fuel tank 15 side is released to the canister 34 side. Therefore, the pressure at the fuel tank 15 side can be prevented from increasing over the excessive pressure.

The positive-pressure relief valve mechanism 130 and the negative-pressure relief valve mechanism 132 constitute the relief valve 54 (refer to FIG. 7). The relief valve 54 and the electric-operated valve 52 are integrally housed in the valve casing 56 as the closing valve 38 (refer to FIG. 2). Thus, the electric-operated valve 52 and the relief valve 54 can be compactly put together as the closing valve 38.

The relief valve 54 concentrically has the positive-pressure relief valve mechanism 130 and the negative-pressure relief valve mechanism 132. And, the electric-operated valve 52 and the relief valve 54 are placed such that their axial directions are different from each other. In more detail, the axis of the electric-operated valve 52 extends in the front-rear direction. Whereas, the axis of the relief valve 54 extends in the vertical direction. And, the axes of the electric-operated valve 52 and the relief valve 54 do not intersect. That is, the axes correspond to skew lines. Thus, the closing valve 38 can be formed compactly compared with a case where the electric-operated valve 52 and the relief valve 54 are positioned such that their axial directions are parallel to each other (for example, refer to Japanese Laid-Open Patent Publication No. 2012-524878).

The valve casing 56 defines the main passage 74, which has the first valve opening 71 opened and closed by the electric-operated valve 52, and the bypass passage 90, which bypasses the first valve opening 71 and has the second valve opening 80 opened and closed by the relief valve 54. Thus, the closing valve 38 can be formed compactly.

The bypass passage 90 secures a passage sectional area required for it and is communicated with the main passage 74. Thus, it is able to avoid increase in flow resistance (ventilation resistance) of the fuel in the bypass passage 90.

The relief valve 54 is disposed downstream of the second valve opening 80 (upside in FIG. 7). Thus, the second valve opening 80 and the main passage 74 can be positioned closer to each other than a case, for example, where the relief valve 54 is disposed upstream of the second valve opening 80. Accordingly, the valve casing 56 can be downsized.

The main passage 74 has the first passage part 75 and the second passage part 76. The first passage part 75 extends in the same direction with the axial direction of the first valve opening 71 (in the front-rear direction). The second passage part 76 extends in a direction different from the axial direction of the first passage part 75 (in the right-left direction) at a side of the first valve opening 71 opposite to the first passage part 75 side (the rear side) (refer to FIG. 6). Therefore, the length of the main passage 74 along the axial direction of the second passage part 76 (the right-left direction) can be set to be shorter than a case, for example, where the axis of the electric-operated valve 52 and the axis of the linear-shaped main passage 74 intersect at a right angle, thereby downsizing the closing valve 38.

The first passage part 75 and the second passage part 76 form the main passage 74 in the elbow shape (refer to FIG. 6). Thus, the flow resistance (the ventilation resistance) in the main passage 74 can be decreased more than a case, for example, where the main passage is formed in a meander shape.

The closing valve 38 is mounted on the vehicle such that the axis (the axial direction) of the relief valve 54 extends in the vertical direction. Thus, changes in the valve opening pressure of the relief valve 54 can be suppressed. For example, when the relief valve 54 is installed on the vehicle such that its axis is directed in a direction different from the vertical direction, the valve opening pressure of the relief valve 54 changes due to various factors, such as increase in friction resistance of a slide part, and changes in the energizing forces of the coil springs 154 and 161. In contrast, when the relief valve 54 is mounted on the vehicle such that its axis is directed in the vertical direction, the changes in the valve opening pressure of the relief valve 54 can be suppressed due to decrease in the friction resistance of the slide part, suppress of the changes in the energizing forces of the coil springs 154 and 161, or the like. The relief valve 54 according to the present embodiment may be installed upside down on the vehicle.

The length of the closing valve 38 in the axial direction of the relief valve 54, i.e., the length in the vertical direction is short, so the closing valve 38 can be placed at a vertically small space below the floor of the vehicle or the like. Thus, the degree of freedom of mounting the closing valve 38 on the vehicle can be increased. Here, in a case of the closing valve disclosed in Japanese Laid-Open Patent Publication No. 2012-524878, the length of an electric-operated valve and the length of a relief valve in their axial directions are long, so it would be difficult to place the closing valve at a vertically small space below the floor of the vehicle or the like. Thus, there is a problem that the degree of freedom of mounting the closing valve on the vehicle is low. On the other hand, the closing valve 38 according to the present embodiment can solve such problem.

Second Embodiment

Figure 15:
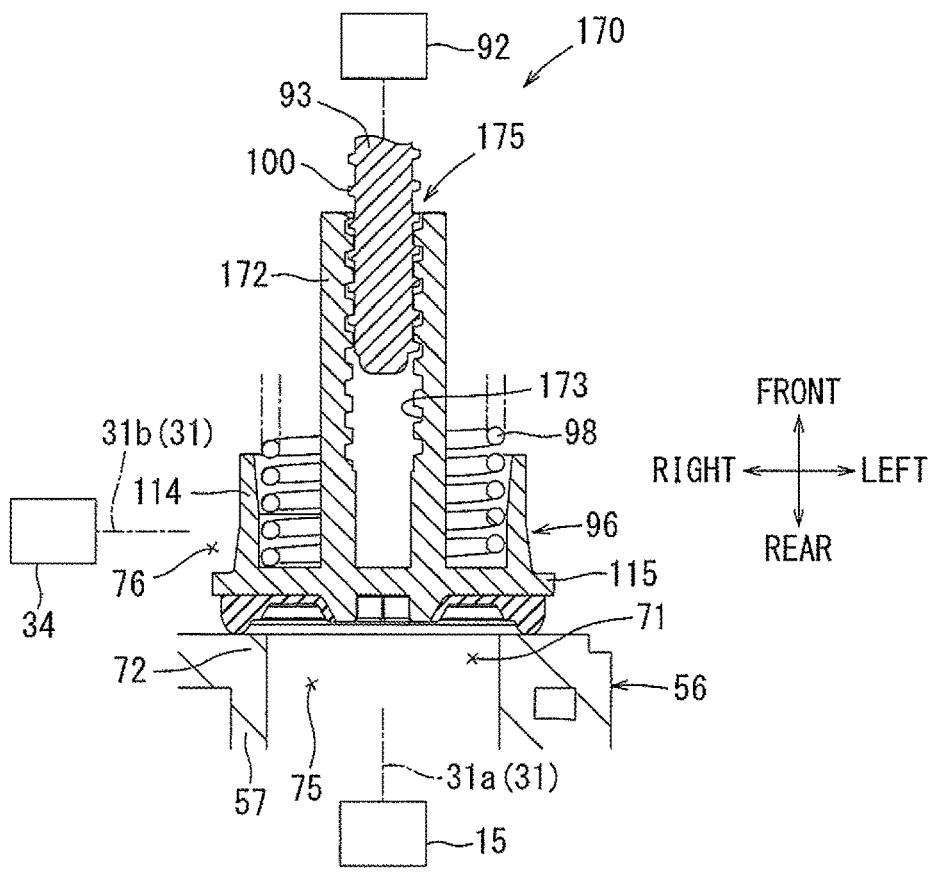
FIG. 15 is a cross-sectional view of the electric-operated valve in a closed state according to a second embodiment.
Figure 16:
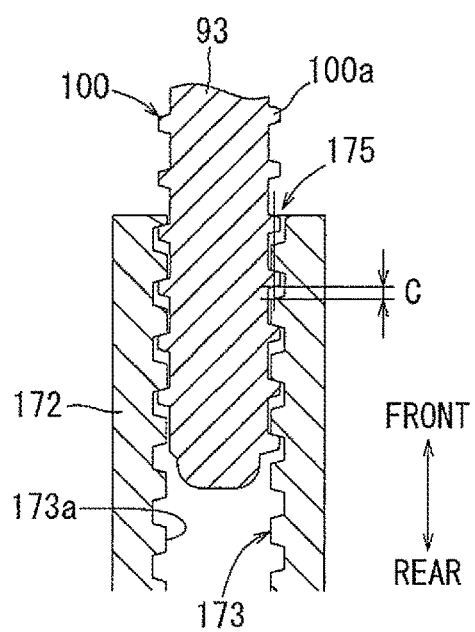
FIG. 16 is a cross-sectional view of a part of a feed screw mechanism of the electric-operated valve.

A second embodiment corresponds to the first embodiment with some changes, so the changes will be described, and the same configurations will not be described again. FIG. 15 is a cross-sectional view of the electric-operated valve in the closed state. FIG. 16 is a cross-sectional view of a part of the feed screw mechanism of the electric-operated valve. As shown in FIG. 15, in the electric-operated valve (labelled with reference number 170) of the present embodiment, the valve guide 94, the auxiliary spring 112, and the engaging projections 122 of the valve body 96 of the electric-operated valve 52 according to the first embodiment (refer to FIG. 10) are omitted. The valve plate part 115 of the valve body 96 is concentrically provided with a cylindrical shaft part 172, which extends forward (upward in FIG. 15) and is formed in a hollow cylindrical shape. A female screw part 173 is formed at an internal surface of the cylindrical shaft part 172. The female screw part 173 of the cylindrical shaft part 172 is screwed with the male screw part 100 of the output shaft 93 of the stepping motor 92. Thus, the valve body 96 is moved in the axial direction (the vertical direction in FIG. 15) depending on the forward and reverse rotations of the output shaft 93. The male screw part 100 of the output shaft 93 and the female screw part 173 of the valve body 96 constitute a feed screw mechanism 175.

As shown in FIG. 16, in the feed screw mechanism 175, the male screw part 100 of the output shaft 93 and the female screw part 173 of the cylindrical shaft part 172 are screwed with each other in a relatively movable manner within a predetermined range. That is, a clearance C is defined between a screw thread part 100a of the male screw part 100 and a screw thread part 173a of the female screw part 173 in the axial direction. The valve body 96 is energized rearward (downward in FIG. 15) by the valve spring 98 such that the screw thread part 173a of the female screw part 173 is kept to be pressed rearward (downward in FIG. 16) against the screw thread part 100a of the male screw part 100. The valve spring 98 is disposed between the valve plate part 115 of the valve body 96 and the a fixed side wall (not shown) of the stepping motor 92, which faces the valve plate part 115, and constantly energizes the valve body 96 rearward (in the closing direction).

In the electric-operated valve 170, the stroke control of the valve body 96 in the axial direction is carried out by the stepping motor 92 via the feed screw mechanism 175. Thus, the valve opening amount (the lift) of the valve body 96 is controlled by moving the valve body 96 in the front-rear direction. When the stepping motor 92 is operated for valve closing, the output shaft 93 is rotated in the valve closing direction, so the valve body 96 is moved rearward (downward in FIG. 15) via the feed screw mechanism 175. At that time, the valve spring 98 stretches due to its elastic restoring force while energizing the valve body 96 rearward. Then, when the valve body 96 (specifically, the first seal member 117) abuts on the valve seat 72 of the valve casing 56, downward movement of the valve body 96 is prevented, and the valve closing operation of the stepping motor 92 is stopped. This resulting condition corresponds to the valve closed state (refer to FIG. 15).

Under a condition where the electric-operated valve 170 is in the closed state, when the stepping motor 92 is driven for valve opening, the output shaft 93 is rotated in the valve opening direction, so the valve body 96 is moved forward (upward in FIG. 15) via the feed screw mechanism 175. At that time, the valve spring 98 is compressed against its elasticity. Thus, the first seal member 117 of the valve body 96 gets away from the valve seat 72 of the valve casing 56, thereby shifting into the valve open state.

Under a condition where the electric-operated valve 170 is in the closed state, the valve body 96 is elastically kept to abut on the valve seat 72 of the valve casing 56 due to the energizing force of the valve spring 98 (refer to FIG. 15). When the pressure at the fuel tank 15 side is equal to or higher than the valve opening pressure of the positive-pressure relief valve mechanism 130 by the predetermined value upon a failure of the positive-pressure relief valve mechanism 130 of the relief valve 54 (refer to FIG. 7), the valve body 96 is moved in the valve opening direction (upward in FIG. 15) against energization by the valve spring 98. That is, the valve body 96 is moved forward (upward in FIG. 15) relative to the output shaft 93 of the stepping motor 92 through the use of the axial clearance C (refer to FIG. 16) between the screw thread part 100a of the male screw part 100 and the screw thread part 173a of the female screw part 173. Thus, the valve body 96 is moved to the valve open position, so the pressure at the fuel tank 15 side is released to the canister 34 side. Accordingly, the pressure at the fuel tank 15 side can be prevented from increasing over the excessive pressure.

Technical configurations based on the above-described embodiment except configurations described in claims will be shown below.

(1) A flow control valve includes an electric-operated valve opening and closing a passage based on electric control, a relief valve having a positive-pressure relief valve mechanism and a negative-pressure relief valve mechanism, and a valve casing housing the electric-operated valve and the relief valve therein. The positive-pressure relief valve mechanism is configured to open when a pressure upstream of the electric-operated valve has a value that is equal to or higher than a predetermined positive pressure value. The negative-pressure relief valve mechanism is configured to open when the pressure upstream of the electric-operated valve has a value that is equal to or lower than a predetermined negative pressure value. The relief valve concentrically has the positive-pressure relief valve mechanism and the negative-pressure relief valve mechanism. The electric-operated valve and the relief valve are placed such that their axial directions are different from each other.

(2) In the flow control valve of (1), the valve casing defines a main passage and a bypass passage. The main passage has a first valve opening, which is opened and closed by the electric-operated valve. The bypass passage bypasses the first valve opening and has a second valve opening, which is opened and closed by the relief valve.

(3) In the flow control valve of (2), the bypass passage has a predetermined passage sectional area and is communicated with the main passage.

(4) In the flow control valve of (2) or (3), the relief valve is placed downstream of the second valve opening.

(5) In the flow control valve of any one of (2) to (4), the main passage includes a first passage part and a second passage part. The first passage part extends in a direction same with an axial direction of the first valve opening. The second passage part extends in a direction different from an axial direction of the first passage part at a side of the first valve opening opposite to the first passage part side.

(6) An evaporated fuel treatment device includes a vapor passage connecting a fuel tank to a canister, and a closing valve disposed on the vapor passage. The closing valve is composed of the fuel control valve of any one of (1) to (5).

(7) The evaporated fuel treatment device of (6) is mounted on a vehicle such that an axis of the relief valve extends in the vertical direction.

The present disclosure is not limited to the above-described embodiments and can be modified without departing from the gist of the invention. For example, the flow control valve as the closing valve 38 can be used for various devices, not only the evaporated fuel treatment device 12. The electric-operated motor of the electric-operated valve of the closing valve 38 may be composed of a DC motor capable of controlling its rotation direction, rotation rate and rotation quantity, not only the stepping motor 92. When the DC motor is employed, it is preferable to use a stroke sensor detecting a position of the valve guide 94 in order to initialize the origin. The electric-operated motor may house a feed screw mechanism therein and have an output shaft moving in the axial direction. In such case, the output shaft may be integrated with the valve guide 94. The electric-operated valve 52 may be composed of a solenoid valve including an electromagnetic solenoid, such that it is closed in a non-conducting state and that it is open in a conducting state. The number of the coupling mechanisms 120 can be changed as necessary. The engaging projections 122 and the engaged grooves 124 of the coupling mechanisms 120 may be formed in a contrary manner. That is, the engaging projections 122 may be formed at the valve guide 94, whereas the engaged grooves 124 may be formed at the valve body 96. The valve body 96 may be coupled to the output shaft of the stepping motor 92 or the like via the feed screw mechanism 110, thereby omitting the valve guide 94 and the auxiliary spring 112. The electric-operated valve 52 and the relief valve 54 may be placed such that their axial directions are different from each other, and their directions are not limited.

The invention claimed is:

1. An evaporated fuel treatment device comprising:
a vapor passage in communication between a fuel tank and a canister;
an electric-operated valve including a valve body, the electric-operated valve configured to open and close the vapor passage and control a flow rate of fluid flowing through the vapor passage by electrical control;
a positive-pressure relief valve mechanism configured to open when a pressure at a fuel tank side of the vapor passage is equal to or greater than a predetermined positive pressure value;
a negative-pressure relief valve mechanism configured to open when the pressure at the fuel tank side of the vapor passage is equal to or less than a predetermined negative pressure value,
wherein the valve body of the electric-operated valve is configured to move, independently of the electric control of the electric-operated valve, in a valve opening direction due to the pressure at the fuel tank side that is directly received by the valve body and is greater than a valve opening pressure of the positive-pressure relief valve mechanism by a predetermined value;
wherein the electric-operated valve includes an electric-operated motor having an output shaft configured to move in an axial direction thereof,
wherein the output shaft of the electric-operated motor is provided with a valve guide via a feed screw mechanism such that a stroke of the valve guide in the axial direction is controlled,
wherein the valve guide is provided with the valve body such that the valve body is configured to move in the axial direction within a predetermined range,
wherein the valve body is energized by a spring in a valve closing direction,
wherein the spring is disposed between the valve body and the valve guide, and energization by the spring when the pressure at the fuel tank side is greater than the valve opening pressure of the positive-pressure relief valve mechanism by the predetermined value under a condition where the electric-operated valve is in a closed state.

2. An evaporated fuel treatment device comprising:
a vapor passage in communication between a fuel tank and a canister
an electric-operated valve including a valve body, the electric-operated valve configured to open and close the vapor passage and control a flow rate of fluid flowing through the vapor passage by electrical control,
a positive-pressure relief valve mechanism configured to open when a pressure at a fuel tank side of the vapor passage is equal to or greater than a predetermined positive pressure value;
a negative-pressure relief valve mechanism configured to open when the pressure at the fuel tank side of the vapor passage is equal to or less than a predetermined negative pressure value,
wherein the valve body of the electric-operated valve is configured to move, independently of the electric control of the electric-operated valve, in a valve opening direction due to the pressure at the fuel tank side that is directly received by the valve body and is greater than a valve opening pressure of the positive-pressure relief valve mechanism by a predetermined value,
wherein the electric-operated valve includes an electric-operated motor having an output shaft configured to move in an axial direction thereof,
wherein the output shaft of the electric-operated motor is provided with the valve body via a feed screw mechanism such that a stroke of the valve body in the axial direction is controlled and that the feed screw mechanism is configured to move the valve body relative to the output shaft in the axial direction within a predetermined range while the output shaft is stopped, wherein the valve body is energized by a spring in a valve closing direction, wherein the spring energizes the valve body in a direction away from the output shaft along the axial direction, and wherein the valve body is configured to move in the valve opening direction against energization by the spring when the pressure at the fuel tank side is greater than the valve opening pressure of the positive-pressure relief valve mechanism by the predetermined value under a condition where the electric-operated valve is in a closed state.

3. The evaporated fuel treatment device according to claim 1, wherein the positive-pressure relief valve mechanism and the negative-pressure relief valve mechanism constitute a relief valve, and wherein the relief valve and the electric-operated valve are integrally housed in a valve casing to form a closing valve.

4. The evaporated fuel treatment device according to claim 3, wherein the relief valve concentrically has the positive-pressure relief valve mechanism and the negative-pressure relief valve mechanism, and wherein the electric-operated valve and the relief valve are placed such that their axial directions are different from each other.

5. The evaporated fuel treatment device according to claim 4, wherein the valve casing defines a main passage and a bypass passage, wherein the main passage has a first valve opening, which is opened and closed by the electric-operated valve, and wherein the bypass passage bypasses the first valve opening and has a second valve opening, which is opened and closed by the relief valve.

6. The evaporated fuel treatment device according to claim 5, wherein the bypass passage has a predetermined passage sectional area and is in communication with the main passage.

7. The evaporated fuel treatment device according to claim 5, wherein the relief valve is disposed downstream of the second valve opening.

8. The evaporated fuel treatment device according to claim 5, wherein the main passage includes a first passage part and a second passage part, wherein the first passage part extends in a same direction with an axial direction of the first valve opening, and wherein the second passage part extends in a different direction from an axial direction of the first passage part at a side of the first valve opening opposite to the first passage part side.

9. The evaporated fuel treatment device according to claim 4, wherein the closing valve is mounted on a vehicle such that an axis of the relief valve extends in a vertical direction with respect to the vehicle.

10. The evaporated fuel treatment device according to claim 2, wherein the positive-pressure relief valve mechanism and the negative-pressure relief valve mechanism constitute a relief valve, and wherein the relief valve and the electric-operated valve are integrally housed in a valve casing to form a closing valve.

11. The evaporated fuel treatment device according to claim 10, wherein the relief valve concentrically has the positive-pressure relief valve mechanism and the negative-pressure relief valve mechanism, and wherein the electric-operated valve and the relief valve are placed such that their axial directions are different from each other.

12. The evaporated fuel treatment device according to claim 11, wherein the valve casing defines a main passage and a bypass passage, wherein the main passage has a first valve opening, which is opened and closed by the electric-operated valve, and wherein the bypass passage bypasses the first valve opening and has a second valve opening, which is opened and closed by the relief valve.

13. The evaporated fuel treatment device according to claim 12, wherein the bypass passage has a predetermined passage sectional area and is in communication with the main passage.

14. The evaporated fuel treatment device according to claim 12, wherein the relief valve is disposed downstream of the second valve opening.

15. The evaporated fuel treatment device according to claim 12, wherein the main passage includes a first passage part and a second passage part, wherein the first passage part extends in a same direction with an axial direction of the first valve opening, and wherein the second passage part extends in a different direction from an axial direction of the first passage part at a side of the first valve opening opposite to the first passage part side.

16. The evaporated fuel treatment device according to claim 11, wherein the closing valve is mounted on a vehicle such that an axis of the relief valve extends in a vertical direction with respect to the vehicle.

* * * * *

UNITED STATES PATENT AND TRADEMARK OFFICE
CERTIFICATE OF CORRECTION

PATENT NO. : 10,934,976 B2
APPLICATION NO. : 15/539207
DATED : March 2, 2021
INVENTOR(S) : Shinji Murai It is certified that error appears in the above-identified patent and that said Letters Patent is hereby corrected as shown below:

In the Claims

Claim 1, Column 20, Lines 32-38, the phrase "wherein the spring is disposed between the valve body and the valve guide, and energization by the spring when the pressure at the fuel tank side is greater than the valve opening pressure of the positive-pressure relief valve mechanism by the predetermined value under a condition where the electric-operated valve is in a closed state" should instead be changed to -- wherein the spring is disposed between the valve body and the valve guide, and wherein the valve body is configured to move in the valve opening direction against energization by the spring when the pressure at the fuel tank side is greater than the valve opening pressure of the positive-pressure relief valve mechanism by the predetermined value under a condition where the electric-operated valve is in a closed state. --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*